(12) United States Patent
Ichikawa et al.

(10) Patent No.: US 7,410,929 B2
(45) Date of Patent: Aug. 12, 2008

(54) CELL STRUCTURAL BODY, METHOD OF MANUFACTURING CELL STRUCTURAL BODY, AND CATALYST STRUCTURAL BODY

(75) Inventors: Yukihito Ichikawa, Nagoya (JP); Makoto Miyazaki, Nagoya (JP); Yasushi Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 680 days.

(21) Appl. No.: 10/508,838

(22) PCT Filed: Mar. 27, 2003

(86) PCT No.: PCT/JP03/03858

§ 371 (c)(1),
(2), (4) Date: Sep. 23, 2004

(87) PCT Pub. No.: WO03/082467

PCT Pub. Date: Oct. 9, 2003

(65) Prior Publication Data

US 2005/0107244 A1      May 19, 2005

(30) Foreign Application Priority Data

Mar. 28, 2002   (JP) ............................. 2002-090481

(51) Int. Cl.
| | |
|---|---|
| *B01J 21/04* | (2006.01) |
| *B01J 23/02* | (2006.01) |
| *B01D 50/00* | (2006.01) |
| *B01D 53/34* | (2006.01) |
| *B01D 59/50* | (2006.01) |
| *B32B 3/12* | (2006.01) |

(52) U.S. Cl. .................. 502/300; 502/439; 502/527.19; 502/527.24; 502/527.14; 502/527.15; 502/527.16; 55/323; 422/177; 428/116

(58) Field of Classification Search ............ 502/527.19, 502/527.24, 527.14–527.16, 439; 55/323; 422/177; 428/116
See application file for complete search history.

(56) References Cited

U.S. PATENT DOCUMENTS 3,893,952 A * 7/1975 Ryska et al. ................ 502/439

(Continued)

FOREIGN PATENT DOCUMENTS

DE      195 02 345 A1      8/1995

(Continued)

OTHER PUBLICATIONS

Energy Saving, "Rotary Switching Single Type Regenerative Burner," vol. 48, No. 10, pp. 47-49, 1996 with partial tranlsation.

*Primary Examiner*—Jerry Lorengo
*Assistant Examiner*—Patricia L Hailey
(74) *Attorney, Agent, or Firm*—Oliff & Berridge, PLC

(57) ABSTRACT

A cell structure 10 having a plurality of cells 2 which are partitioned with partition walls 1 to form a honeycomb and which are flow paths of fluid, an outer wall 5 which encloses the cells 2 and a cavity 3 which pierces in the direction of a central axis P of the structure through a portion including the central axis P or a given axis parallel to the central axis P, where the cell structure further has an inner wall 4 on the inner surface of the cavity 3, a method for producing the cell structure, and a catalyst structure. The cell structure having the cavity has an excellent isostatic breaking strength and can exhibit proper sealing function in its cavities. Furthermore, a method for producing the cell structure, the catalyst structure, etc. are provided.

25 Claims, 23 Drawing Sheets

U.S. PATENT DOCUMENTS

| | | | |
|---|---|---|---|
| 4,277,376 A * | 7/1981 | Paolasini | 502/439 |
| 4,428,758 A * | 1/1984 | Montierth | 55/523 |
| 4,488,833 A * | 12/1984 | Perry et al. | 404/35 |
| 4,557,682 A * | 12/1985 | Montierth | 425/121 |
| 4,740,408 A * | 4/1988 | Mochida et al. | 428/116 |
| 5,315,824 A | 5/1994 | Takeshima | |
| 5,494,881 A * | 2/1996 | Machida et al. | 502/439 |
| 2002/0117773 A1 | 8/2002 | Yamada et al. | |
| 2004/0161596 A1* | 8/2004 | Taoka et al. | 428/304.4 |
| 2004/0166035 A1* | 8/2004 | Noda et al. | 422/180 |

FOREIGN PATENT DOCUMENTS

| | | |
|---|---|---|
| EP | 0 661 098 A2 | 7/1995 |
| EP | 0 976 679 A1 | 2/2000 |
| EP | 1 138 892 A2 | 10/2001 |
| EP | 1 153 649 A1 | 11/2001 |
| JP | A 61-108507 | 5/1986 |
| JP | A 2-102004 | 4/1990 |
| JP | U 2-142625 | 12/1990 |
| JP | A 7-232084 | 9/1995 |
| JP | A 8-67502 | 3/1996 |
| JP | A 9-173866 | 7/1997 |
| JP | A 11-211371 | 8/1999 |
| JP | A 2000-44204 | 2/2000 |
| JP | 2002-321210 * | 11/2002 |
| JP | A 2002-321210 | 11/2002 |

* cited by examiner

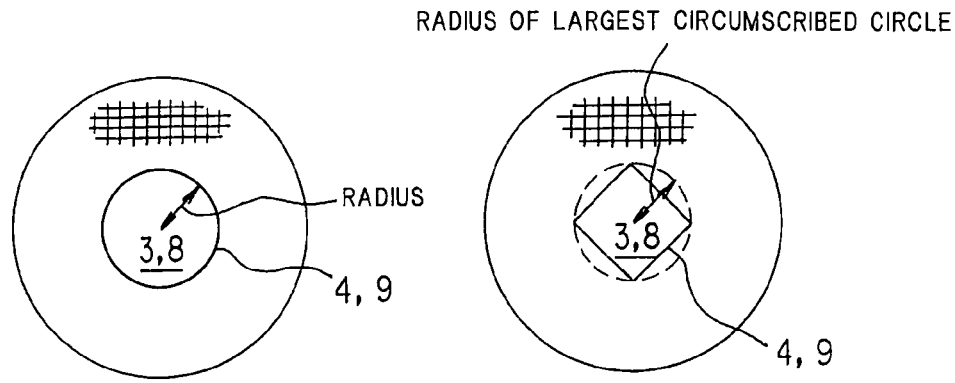
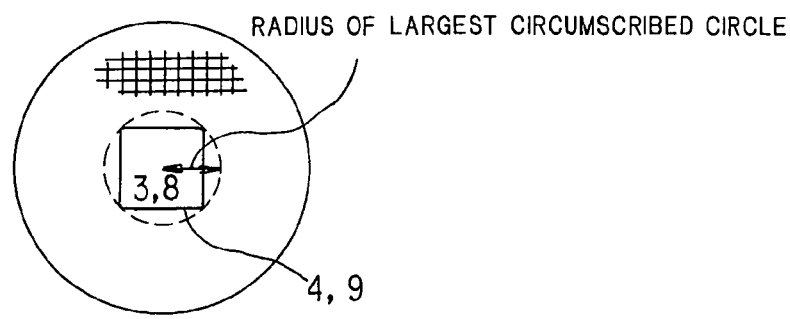
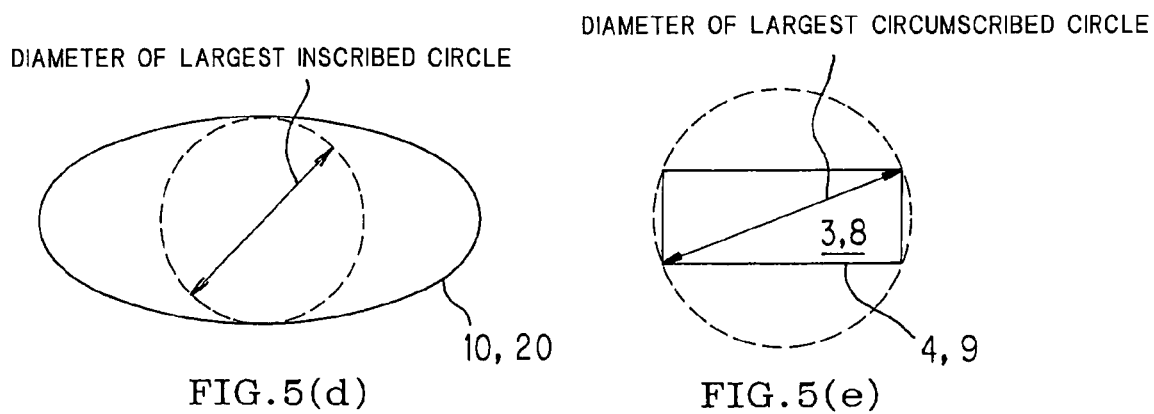
FIG.5(a)   FIG.5(b)   FIG.5(c)   FIG.5(d)   FIG.5(e)

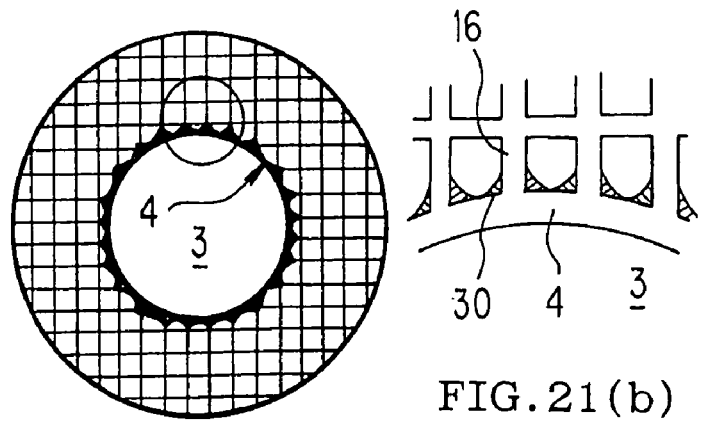
FIG.21(a)
FIG.21(b)
FIG.22
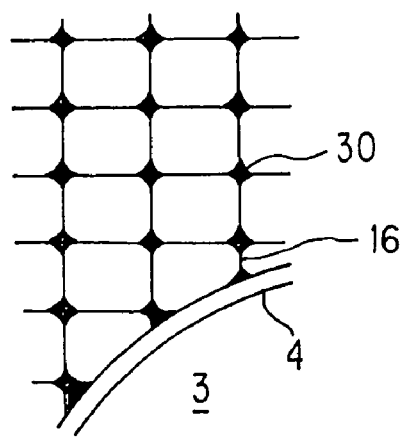
FIG.23
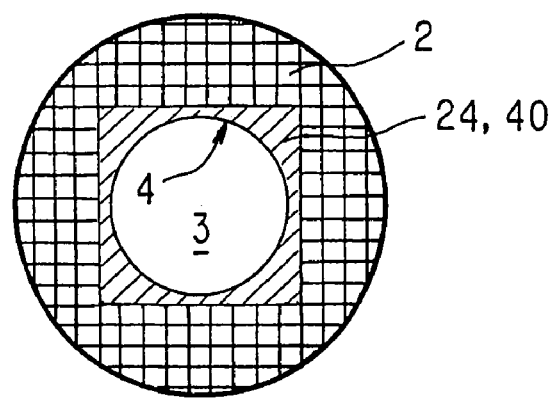

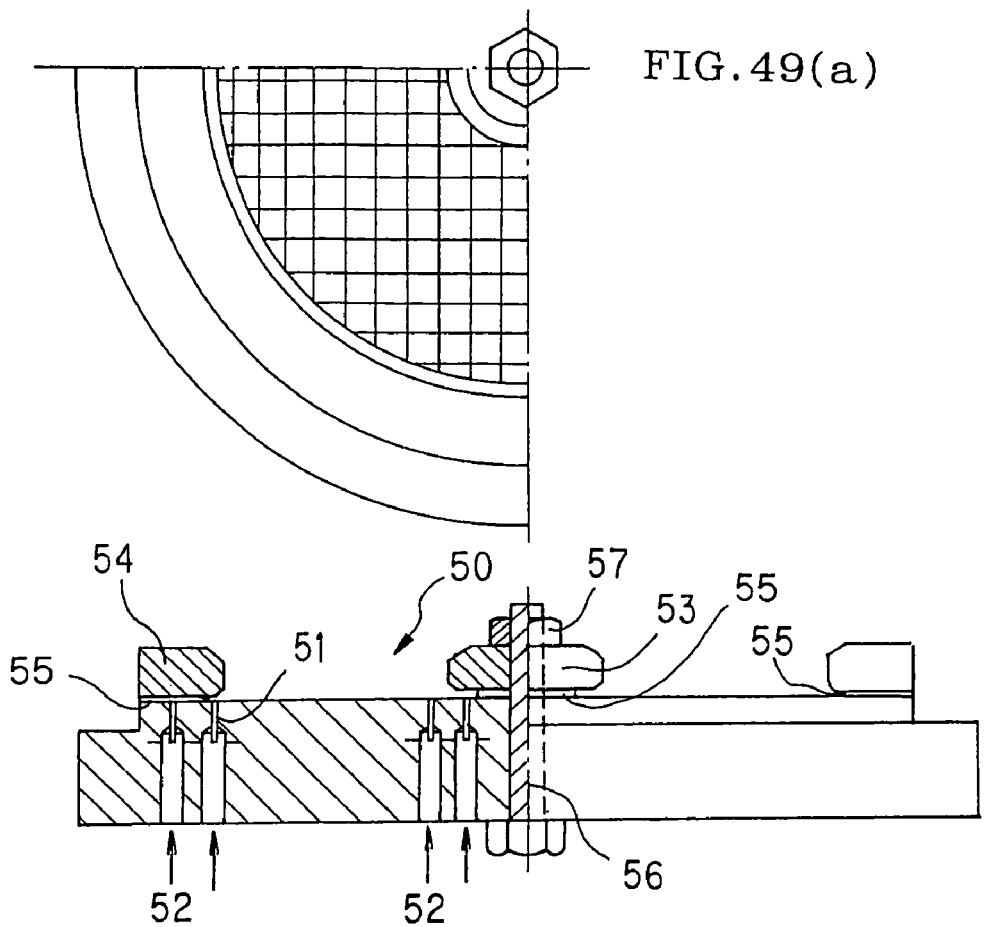
FIG. 49(a)
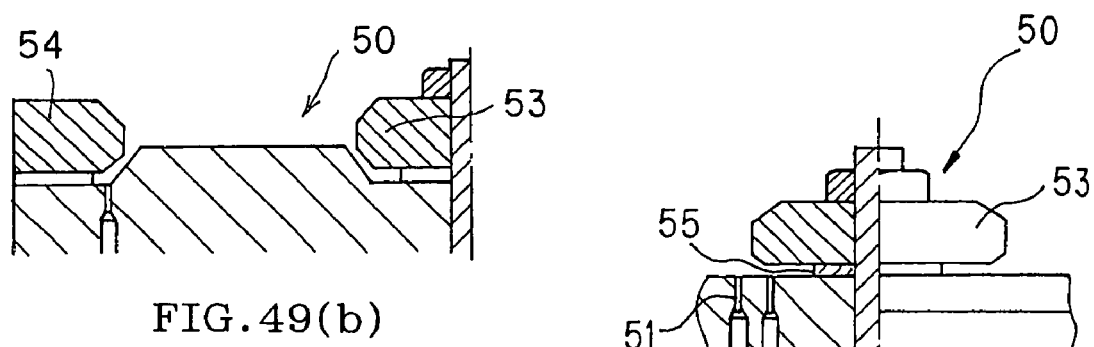
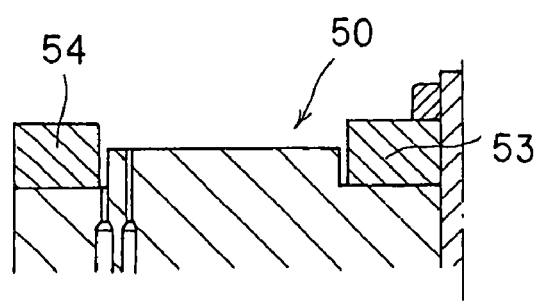
FIG. 49(b)
FIG. 49(c)
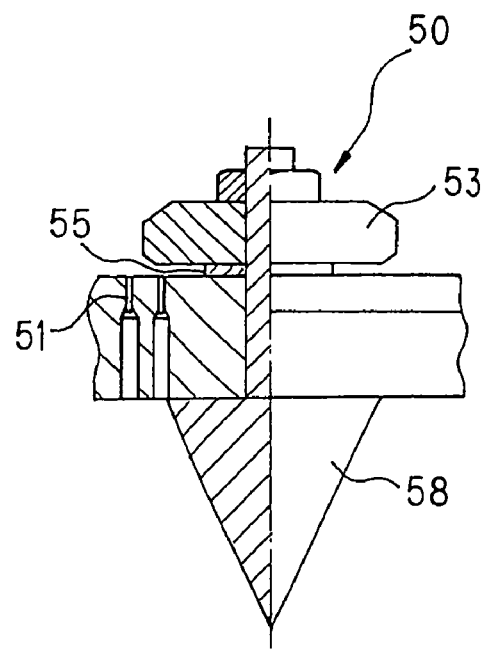
FIG. 49(d)

BREAKING POSITION

BREAKING PARTITION WALL

CELL STRUCTURAL BODY, METHOD OF MANUFACTURING CELL STRUCTURAL BODY, AND CATALYST STRUCTURAL BODY

TECHNICAL FIELD

The present invention relates to a cell structure, a method for producing the same, a catalyst structure, etc. More particularly, it relates to a cell structure which has an excellent isostatic breaking strength and can exhibit proper sealing function in its cavity, a method for producing the cell structure, a catalyst structure, etc.

BACKGROUND ART

Hitherto, cell structures a having cavity in the form of being bored in the direction of central axis (for example, honeycomb structures) have been used for various uses. For example, there is disclosed an adsorption-device which has a bypass mechanism for internal combustion engines and which has such a construction that at the time of cold starting, hydrocarbons contained in an exhaust gas from internal combustion engines (for example, automobiles) are adsorbed to an adsorptive material supported on cell partition walls by passing the gas through a cell portion of a honeycomb structure, and thereafter the gas is led to a catalyst in the state of low reactivity to diminish the burden, and after warming up, the flow path of the gas is changed to the hollows of the honeycomb structure to lead the gas to a catalyst in the state of the reactivity being increased (U.S. Pat. No. 5,315,824).

Furthermore, an adsorptive body for purification of exhaust gas in which a well portion for blowing of gas in order to secure gas passage (for blowing of exhaust gas therethrough) is formed in a honeycomb structure is disclosed (JP-A-7-232084).

Moreover, an apparatus in which another structure (catalyst converter) is provided in a hollow pore is disclosed (German Patent DE19502345A1).

A holding structure for a heat storage body in which a fuel nozzle is disposed in a central cavity of a cylindrical honeycomb heat storage body as a heat exchanger (JP-A-11-211371).

Further, there is disclosed a rotary switching single type regenerative burner in which a burner is provided in a central cavity of a honeycomb heat storage body whereby the heat storing portion and the burner portion are integrated("Energy Saving", Vol. 48, No. 10, 1996; title "rotary switching single type regenerative burner").

As a reformer for fuel cells, etc., there is disclosed a fuel reformation apparatus according to which a gas is passed through a doughnut-shaped catalyst portion and then the gas is passed through the inner hollow portion of the doughnut-shaped catalyst portion (JP-A-8-67502).

Furthermore, there is disclosed a hydrogen purification apparatus in which a reaction chamber is provided at outer periphery of a tubular reformed gas flow path, a honeycomb catalyst body is provided inside the reaction chamber, and a heat exchanging fin is provided on the wall surface of the reformed gas flow path which contacts with the downstream side of the catalyst body (JP-A-2000-44204).

As mentioned above, cavities formed in honeycomb structures used for the above uses have important roles to perform a function as a bypass for heat, a function of accelerating rise of temperature of catalyst, a function of holding other structures, and the like.

However, it has become clear that as shown in FIG. 50, when an isostatic pressure F is externally applied to the outer peripheral surface of a honeycomb structure 100 having a cavity, and the pressure externally applied to the outer surface F reaches a certain value, there occurs a peculiar phenomenon that the honeycomb structure is broken in such a manner that the inner side portion as shown by a dotted line in FIG. 50 falls into the cavity. Thus, the conventional cell structures have a problem in isostatic breaking strength for holding the structure in a container while securing sufficient reliability in endurance.

Furthermore, in the case of sealing the cavity against passing of fluid through cells which are flow paths, the periphery of the cavity is demanded to have such a mechanical strength as endurable against sealing force and besides it is demanded to secure a sufficient sealing face. However, the conventional cell structures cannot sufficiently meet these demands. That is, sealing is generally carried out by pressing a sealing member to the inner peripheral surface of the cavity at the end face of the cell structure, but in this case the section of the partition wall constituting the cell is a sealing face, and sufficient sealing cannot be performed because the sealing member linearly contacts with the sealing face. Moreover, sealing force is received only by the partition wall and hence no sufficient pressure can be externally applied to the outer peripheral surface due to the restriction in mechanical strength. In such a case, the direction of flow path of fluid through the cells around the cavity or compressive strength of the cell structure in the direction of central axis is important, and it is necessary to design a honeycomb structure so as to give a proper compressive strength in this direction.

DISCLOSURE OF INVENTION

The present invention has been made to solve the above problems, and the object of the present invention is to provide a cell structure which has an excellent isostatic breaking strength and can develop proper sealing function at a cavity, a method for making the same, a catalyst structure, and the like.

As a result of intensive research conducted by the inventors on behavior of deformation in cell shape around the breaking position of a cell structure having a cavity, the following have been found. That is, since such a cell structure is, for example, a honeycomb structure or a foam structure, the shape of cell is deformed in such a manner that a shear force is applied thereto and the partition wall is appeared to be broken as shown in FIG. 51. Thus, it has been found that the isostatic breaking strength can be increased by making the cell strong in the direction of break line (in the direction shown by the white arrow in FIG. 51).

The present invention provides the following cell structure, method for producing the same, catalyst structure, and the like.

[1] A cylindrical cell structure comprising a plurality of cells which pierce through the structure between two end faces and act as flow paths of fluid, an outer wall which encloses the cells and a cavity which pierces in the direction of a central axis of the structure through a portion including the central axis or a given axis parallel to the central axis, where an inner wall is further provided on the inner surface of the cavity.

[2] A cell structure described in the above [1], wherein the cells are partitioned in the form of a honeycomb by partition walls.

[3] A cell structure described in the above [2], wherein a strength index represented by the formula: strength index= $(T/CP)^2 \times (B/A)^2$ is not less than 0.02 in which T denotes a thickness (mm) of the partition wall, CP denotes a cell pitch (mm), A denotes a length (mm) of a line formed by linking, along the outer wall, points of intersection of the outer wall and two tangent lines which contact with inside contour of the inner wall and extend in parallel to longitudinal direction of the partition wall, and B denotes a distance (mm) between the point of contact of the tangent line with the inner contour of the inner wall and the point of intersection of the tangent line with the closest outer wall at the section formed by cutting the cell structure along a plane perpendicular to the central axis of the cell structure.

[4] A cell structure described in the above [3], wherein the strength index is not less than 0.04.

[5] A cell structure described in any one of the above [2]-[4], wherein the cell structure has a plurality of cavities and a plurality of the cavities is disposed so as to give a value of B/A larger than the maximum value of B/A of a cell structure having one cavity of a volume equal to the total volume of a plurality of the cavities.

[6] A cell structure described in the above [1] which is a foam structure wherein the cells three-dimensionally communicate with each other through intercellular walls.

[7] A cell structure described in any one of the above [1]-[6], wherein the thickness of the inner wall is not less than 1% of the representative radius of the cells.

[8] A cell structure described in any one of the above [1]-[7], wherein in the case of the section formed by cutting the cell along a plane perpendicular to the central axis being tetragonal or hexagonal, the ratio (d/D) of a representative inner diameter (d) to a representative outer diameter (D) of the honeycomb structure or foam structure is not more than 0.5, and in the case of the section formed by cutting the cell along a plane perpendicular to the central axis being triangle or wavy, the ratio (d/D) of a representative inner diameter (d) to a representative outer diameter (D) of the honeycomb structure or foam structure is not more than 0.8.

[9] A cell structure described in any one of the above [2]-[8], wherein among the partition walls or intercellular walls, the thickness of the partition wall (first or second reinforcing partition wall) or the intercellular wall (first or second intercellular wall) positioned at a given distance from the inner wall in diameter direction is larger than the thickness of other partition walls (ordinary partition walls) or intercellular walls (ordinary intercellular walls).

[10] A cell structure described in any one of the above [2]-[9], wherein in the case of the section formed by cutting the cell along a plane perpendicular to the central axis being tetragonal, among the partition walls or intercellular walls, the thickness of at least one partition wall (a third or fourth reinforcing partition wall) or at least one intercellular wall (a third or fourth reinforcing intercellular wall), the tip of which is arranged close to the inner wall, which contacts with the inner wall or which is externally apart from the inner wall is larger than the thickness of other partition walls (ordinary partition wall) or intercellular walls (ordinary intercellular walls).

[11] A cell structure described in any one of the above [2]-[10], wherein among the cells, the cell density of a given number of cells (first or second reinforcing cells) positioned at a given distance from the inner wall in diameter direction is higher than the cell density of the cells (ordinary cells) other than the first or second reinforcing cells.

[12] A cell structure described in any one of the above [2]-[11], wherein among the cells, a given number of cells (third reinforcing cells) positioned at a given distance from the central axis in diameter direction is partitioned by at least one partition wall (fifth reinforcing partition wall) or intercellular wall (fifth reinforcing intercellular wall) which divides the inside of the cells.

[13] A cell structure described in any one of the above [2]-[12], wherein the partition wall (sixth reinforcing partition wall) or the intercellular wall (sixth reinforcing intercellular wall) which contact with the inner wall has a thick wall portion formed at its contacting portion.

[14] A cell structure described in any one of the above [2]-[13], wherein among the cells, a given number of cells (fourth reinforcing cells) positioned at a given distance from the inner wall in diameter direction is filled in their cell passages with a material for filling therein.

[15] A cell structure described in any one of the above [2]-[14], wherein among the partition walls or intercellular walls, the partition wall (seventh reinforcing partition wall) or the intercellular wall (seventh reinforcing intercellular wall) positioned at a given distance from the inner wall is densified than other partition walls (ordinary partition walls) or intercellular walls (ordinary intercellular walls).

[16] A cell structure described in any one of the above [2]-[15], wherein the partition walls or intercellular walls comprise the partition wall (eighth reinforcing partition wall) concentric with the inner wall and the partition wall (ninth reinforcing partition wall) radial from the central axis, or the intercellular wall (eighth reinforcing intercellular wall) concentric with the inner wall and the intercellular wall (ninth reinforcing intercellular wall) radial from the central axis.

[17] A cell structure described in any one of the above [2]-[15], wherein the partition walls or intercellular walls comprise the partition wall (tenth reinforcing partition wall) concentric with the inner wall and wavy partition wall (eleventh reinforcing partition wall), or the intercellular wall (tenth reinforcing intercellular wall) concentric with the inner wall and wavy intercellular wall (eleventh reinforcing intercellular wall).

[18] A cell structure described in any one of the above [2]-[15], wherein the partition walls or intercellular walls comprise partition wall (twelfth reinforcing partition wall) concentric with the inner wall and corrugated partition wall (thirteenth reinforcing partition wall), or intercellular wall (twelfth reinforcing intercellular wall) concentric with the inner wall and corrugated intercellular wall (thirteenth reinforcing intercellular wall).

[19] A cell structure described in any one of the above [2]-[18], wherein the honeycomb structure or the foam structure and the inner wall comprise at least one component selected from the group consisting of the following component (a), component (b), component (c) and component (d):

(a): ceramic materials containing at least one compound selected from the group consisting of cordierite, alumina, mullite, lithium aluminum silicate, aluminum titanate, titania, zirconia, silicon nitride, aluminum nitride, silicon carbide, calcium silicate, zirconium phosphate, zirconyl phosphate, ceria, yttria and magnesia, (b): ceramic materials containing composites of the compounds shown in (a), (c): heat resistant metals, (d): adsorptive materials containing at least one selected from the group consisting of active carbon, silica gel and zeolite.

[20] A cell structure described in any one of the above [2]-[19], wherein the inner wall comprises a material higher in mechanical strength than the partition wall or the intercellular wall.

[21] A cell structure described in any one of the above [2]-[20], wherein a reinforcing material concentric with the inner wall is provided on the inner surface side of the inner wall, and a cushioning member having compressibility and elasticity is provided between the inner surface of the inner wall and the reinforcing material.

[22] A method for producing a cell structure which comprises extruding a ceramic material from a die having a plurality of grooves formed in the form of slit and firing the extruded product to produce a cell structure having a plurality of cells partitioned with partition walls, characterized in that the ceramic material is extruded from the grooves formed in the form of slit of the die in such a state that a press platen having a given shape for the formation of an inner wall is provided above the central portion of an end face of the die on the ceramic material extruding side and the resulting extruded product is fired, thereby to produce a cell structure having a plurality of cells, a cavity which pierces the portion including the central axis or a given axis parallel to the central axis in the direction of the central axis, and an inner wall on the inner surface of the cavity.

[23] A method for producing a cell structure described in the above [22], wherein a guide for uniformly flowing the ceramic material is provided beneath the press platen for the formation of the inner wall on the ceramic material charging side of the die.

[24] A method for producing a cell structure which comprises extruding a ceramic material from a die having a plurality of grooves formed in the form of slit and firing the extruded product to produce a cell structure having a plurality of cells partitioned with partition walls, characterized in that the ceramic material is extruded from the grooves formed in the form of slit in such a state of masking the grooves formed in the form of slit positioned above the central portion of the end face of the die on the ceramic material extruding side and the resulting extruded product is fired, thereby to produce a first cell structure having a cavity with the partition walls being bared and, furthermore, a given coating material is coated on the inner surface of the cavity of the resulting first cell structure to form an inner wall, thereby to produce a second cell structure having a plurality of the cells, the cavity which pierces the portion including the central axis or a given axis parallel to the central axis in the direction of the central axis, and the inner wall on the inner surface of the cavity.

[25] A method for producing a cell structure which comprises extruding a ceramic material from a die having a plurality of grooves formed in the form of slit and firing the extruded product to produce a cell structure having a plurality of cells partitioned with partition walls, characterized in that the ceramic material is extruded from the die and the resulting extruded product is fired, thereby to obtain a third cell structure having a plurality of cells partitioned with the partition walls, and cells of the third cell structure which are positioned at a given distance from the central axis in diameter direction among a plurality of the cells are bored in the direction of central axis to form a cavity, thereby to obtain a fourth cell structure and simultaneously an inner wall is formed on the inner surface of the cavity of the fourth cell structure.

[26] A catalyst structure, characterized in that a catalyst component for purification of exhaust gas and/or an adsorptive component are supported on the surface of the partition walls or intercellular walls constituting the cell structure described in the above [2]-[21] and/or on the surface of inner pores.

[27] A catalyst structure described in the above [26], wherein both ends of the cells are alternately sealed to allow the fluid passing through the cells acting as flow paths to pass through the inside of the partition wall or intercellular wall.

[28] A catalyst structure described in the above [26] or [27], wherein the adsorptive component is mainly composed of zeolite.

[29] An adsorption apparatus, characterized in that the catalyst structure described in any one of the above [26]-[28] is provided in the flow path of a fluid containing components to be adsorbed.

[30] A fuel reforming apparatus, characterized in that the catalyst structure described in any one of the above [26]-[28] is provided in the flow path of raw material gas and/or gas to be reformed.

[31] A heat recovery apparatus, characterized in that the catalyst structure described in any one of the above [26]-[28] is provided as a heat storage material.

BRIEF DESCRIPTION OF DRAWINGS

FIG. 2(a) shows the case of integrally extrusion molding the inner wall and the partition wall where cells are formed in the shape of tetragon, FIG. 2(b) shows the case of integrally extrusion molding the inner wall and the partition wall where cells are formed in the shape of triangle, FIG. 2(c) shows the case where cells partitioned with partition walls are formed in the shape of tetragon by extrusion molding, a cavity is formed by boring, and an inner wall is formed by coating the inner surface of the cavity with a coating material, and FIG. 2(d) shows the case where cells partitioned with partition walls are formed in the shape of triangle by extrusion molding, a cavity is formed by boring, and an inner wall is formed by coating the inner surface of the cavity with a coating material.

FIGS. 5(a)-(e) schematically show definitions of a representative radius of cavity, a representative inner diameter of inner wall and a representative outer diameter of the cell structure in the present invention.

FIG. 21($a$) is a sectional view of the honeycomb structure which is cut along a plane perpendicular to the central axis and which is the eighteenth embodiment of the cell structure of the present invention (provided with a padding as a thick wall portion) and FIG. 21($b$) is a partially enlarged view thereof.

FIG. 22 is a sectional view of the honeycomb structure which is cut along a plane perpendicular to the central axis and which is the eighteenth embodiment of the cell structure of the present invention (provided with round portion or curved portion as a thick wall portion).

FIG. 23 is a sectional view of the honeycomb structure which is cut along a plane perpendicular to the central axis and which is the nineteenth embodiment of the cell structure of the present invention.

FIGS. 49($a$)-($d$) are sectional views and a plan view which schematically show the die structure used for the first embodiment of the method for producing the cell structure of the present invention, and FIG. 49($a$) shows the case where the shape of end face of a die opposed to the press platen for the formation of outer wall is horizontal, FIG. 49($b$) shows the case where it is tapered, FIG. 49($c$) shows the case where it is perpendicular, and FIG. 49($d$) shows the case where a guide for uniformly flowing the ceramic material is provided beneath the press platen for the formation of inner wall.

BEST MODE FOR CARRYING OUT THE INVENTION

Figure 1:
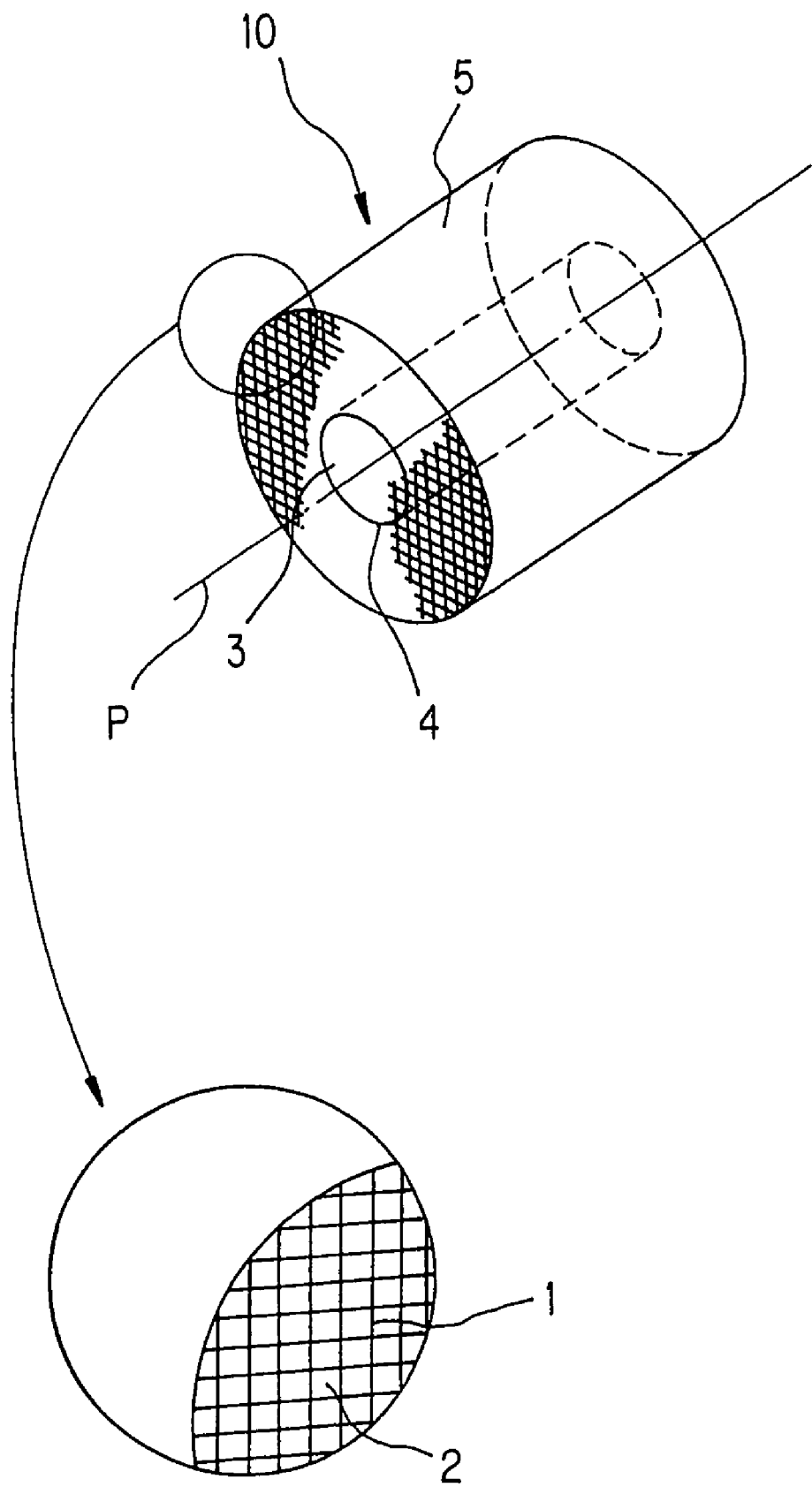
FIG. 1 shows an oblique view and a partially enlarged view which schematically show a honeycomb structure which is the first embodiment of the cell structure of the present invention.

The embodiments of the present invention will be explained in detail referring to the drawings.

The cell structure of the present invention is a cylindrical cell structure comprising a plurality of cells which pierce through the structure between two end faces and which are flow paths of fluid, an outer wall which encloses the cells and a cavity which pierces in the direction of a central axis of the structure through a portion including the central axis or a given axis parallel to the central axis, characterized in that an inner wall is further provided on the inner surface of the cavity.

The cell structure of the present invention may have a plurality of the cavities. The term "central axis" in the present invention means "a central axis of cell structure" unless otherwise notified. Furthermore, the term "cylindrical" in the present invention means a conception which includes the cases where the section of the cell structure cut along a plane perpendicular to the central axis is non-circular and is in the shape of doughnut which is shorter in length in the direction of central axis than the outer diameter. Moreover, the central axis of the cell structure of the present invention may not necessarily agree with the central axis of the cavity. Further, the inner wall is for reinforcement of the structure and/or prevention of fluid from passing between the outside and the inside of the inner wall.

FIG. 1 shows a schematic oblique view and a partially enlarged view thereof which show a honeycomb structure as the first embodiment of the cell structure of the present invention.

As shown in FIG. 1, the honeycomb structure 10 of the first embodiment is a cell structure having a plurality of cells 2 which are partitioned in the form of a honeycomb with partition walls 1 and which act as flow paths of fluid, an outer wall 5 enclosing the cells 2, and a cavity 3 which pierces in the direction of the central axis P through the portion including the central axis P or a given axis parallel to the central axis P, and an inner wall 4 is further provided on the inner surface of the cavity 3.

Figure 2A:
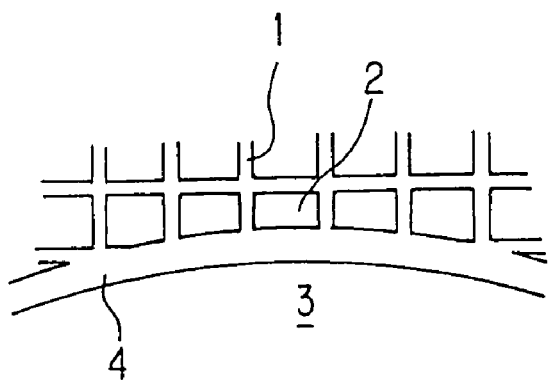
FIGS. 2(a)-(d) schematically show partially enlarged inner wall portions in the first embodiment of the cell structure of the present invention.
Figure 2B:
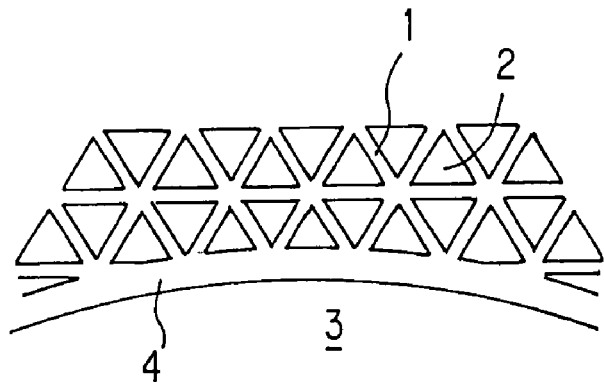
Figure 2C:
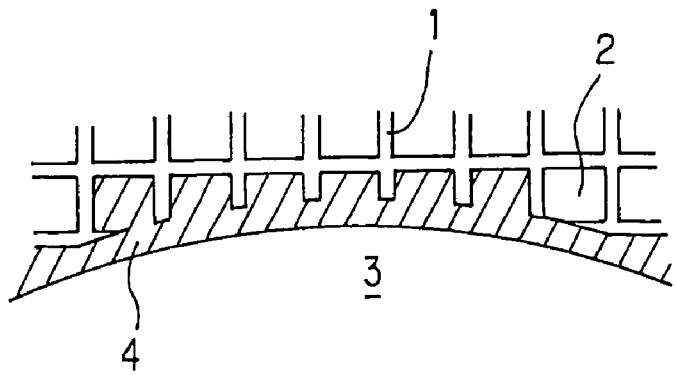
Figure 2D:
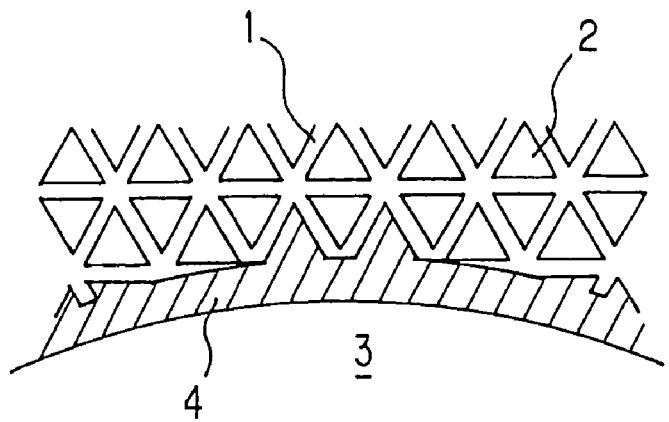

FIGS. 2(a)-(d) schematically show partially enlarged portion of inner wall 4 in the first embodiment, and FIG. 2(a) shows the case of integrally extrusion molding inner wall 4 and partition walls 1 where cells 2 are formed in the shape of tetragon, FIG. 2(b) shows the case of integrally extrusion molding inner wall 4 and partition walls 1 where cells 2 are formed in the shape of triangle, FIG. 2(c) shows the case where cells 2 partitioned with partition walls 1 are formed in the shape of tetragon by extrusion molding, cavity 3 is formed by boring, and inner wall 4 is formed by coating the inner surface of the cavity 3 with a coating material, and FIG. 2(d) shows the case where cells 2 partitioned with partition walls 1 are formed in the shape of triangle by extrusion molding, cavity 3 is formed by boring, and inner wall 4 is formed by coating the inner surface of cavity 3 with a coating material.

As shown in FIGS. 2(c) and (d), in this embodiment, since inside of the cells in the vicinity of the cavity is filled at the end face of the honeycomb structure, area of flat region increases, which is preferred for sealing of fluid.

Figure 3A:
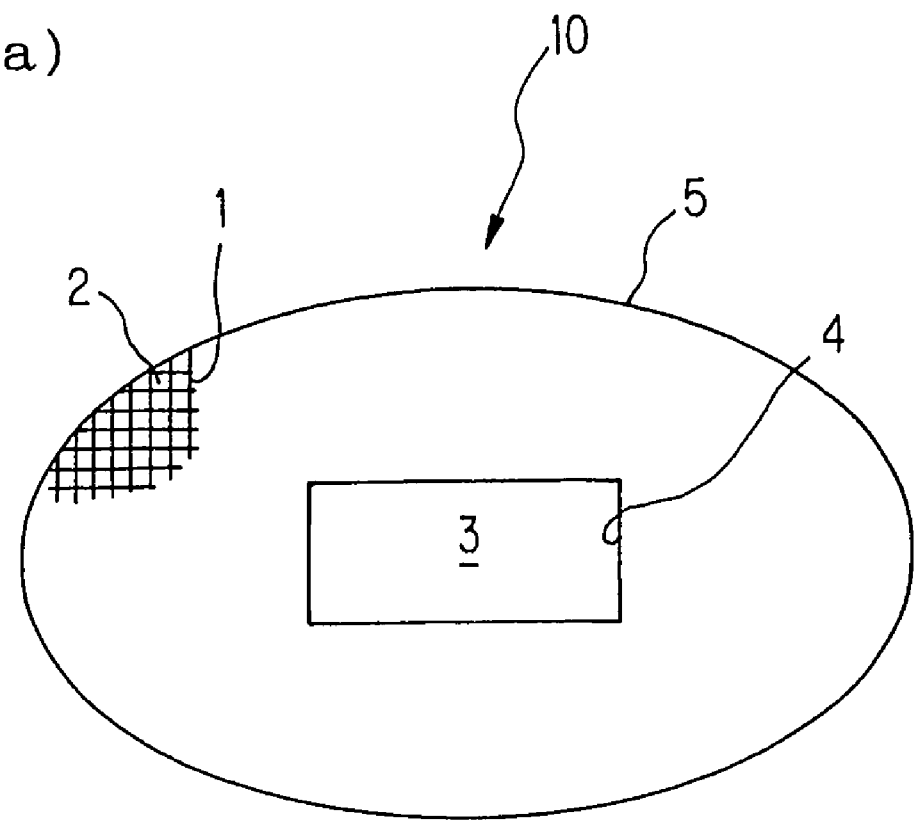
FIGS. 3(a) and (b) schematically show the case where the shape of section cut along a plane perpendicular to the central axis of the cell structure of the present invention is not circular (ellipse).
Figure 3B:
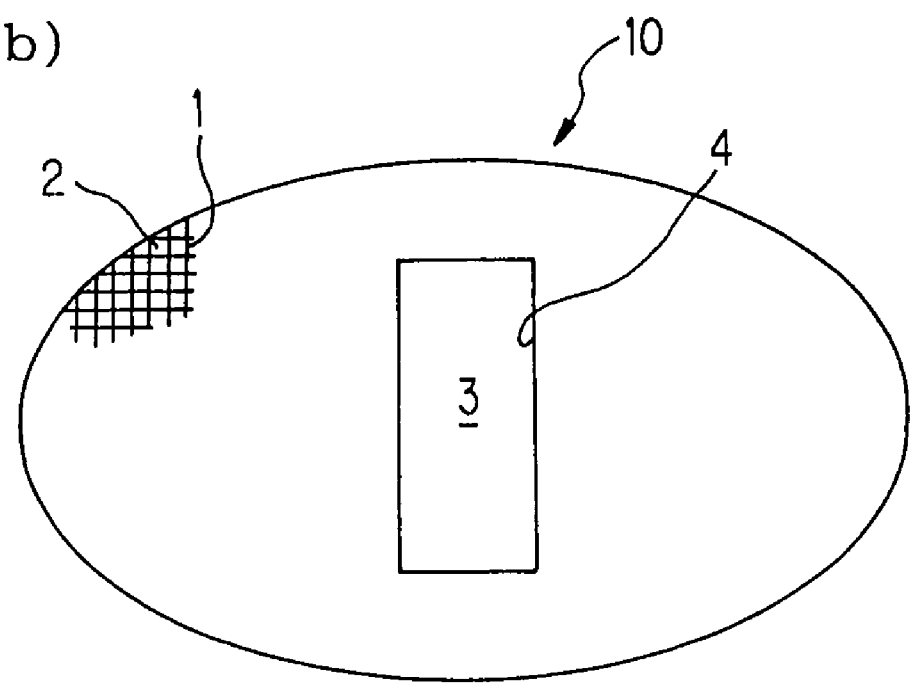

As shown in FIGS. 3(a) and (b), in this embodiment, the shape of section cut along a plane perpendicular to the central axis of the honeycomb structure 10 may be non-circular (FIGS. 3(a) and (b) show honeycomb structure 10, but this may be a foam structure). For example, the shape of the section may be oval, ellipse, irregular shape, polygon, etc. (FIGS. 3(a) and (b) show a shape of oval). Furthermore, the section may be of doughnut shape, and in this case the length in the direction of central axis is shorter than the outer diameter. When the shape of section cut along a plane perpendicular to the central axis of the cell structure is non-circular, the central axis of the honeycomb structure (which may be a foam structure) means an axis passing the center of the diameter of the largest inscribed circle which is inscribed with outer profile of the cell structure (honeycomb structure or foam structure) 10, 20 as shown in FIG. 5(d).

Moreover, the shape of the section of cavity 3 cut along a plane perpendicular to the central axis may be not only circle, but also oval, ellipse, polygon, etc. (FIGS. 3(a) and (b) show the case of rectangle). Furthermore, in this embodiment, the number of cavity may be not only one, but a plurality of the cavities may be present. In addition, the shape of the section of the cells cut along a plane perpendicular to the central axis may also be not only polygon, but also circle, wavy shape, etc. (FIGS. 3(a) and (b) show the case of tetragon).

Figure 4:
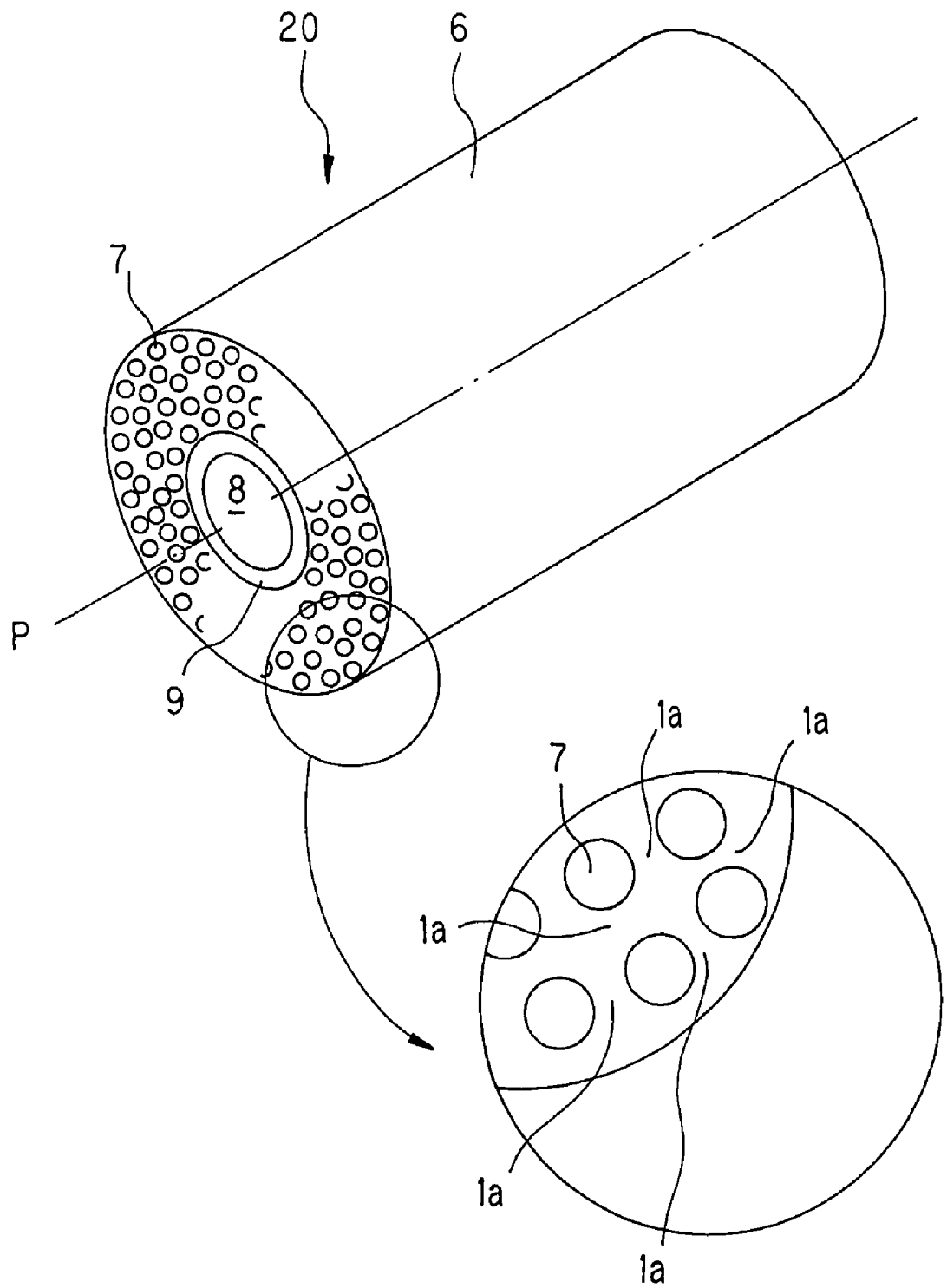
FIG. 4 shows a schematic oblique view and a partially enlarged view of a foam structure which is the second embodiment of the cell structure of the present invention.

FIG. 4 shows a schematic oblique view and a partially enlarged view of a foam structure which is the second embodiment of the cell structure of the present invention.

As shown in FIG. 4, the foam structure 20 of the second embodiment is a cell structure comprising a plurality of cells 7 which three-dimensionally communicate with each other and which are flow paths of fluid, an outer wall 6 which encloses the cells 7 and a cavity 8 which pierces in the direction of a central axis through a portion including the central axis P or a given axis parallel to the central axis P, and the structure 20 further has an inner wall 9 provided on the inner surface of the cavity 8.

In the above embodiments, thickness of the inner wall 4, 9 is preferably not less than 1% of the representative radius of cavity 3, 8 for securing sufficient stiffness of inner wall 4, 9 and securing isostatic breaking strength. The representative radius of cavity 3, 8 here means a radius of the largest circumscribed circle which is circumscribed with an inner profile of the inner wall. Specifically, as shown in FIG. 5(a), in the case of the shape of the section of cavity 3, 8 cut along a plane perpendicular to the central axis being circular, the representative radius means a radius of inner profile of inner wall 4, 9 (circle).

Furthermore, as shown in FIGS. 5(b) and (c), in the case of the shape of the section of cavity 3, 8 being other than circle (FIGS. 5(b) and (c) show the case of the shape of section being tetragon), the representative radius means a radius of the largest circumscribed circle which is circumscribed about inner profile (tetragon). The disposition of cavity 3, 8 which have tetragonal sectional shape shown in FIGS. 5(b) and (c) is different from each other, but the disposition of FIG. 5(b) is preferred from the point of strength.

Furthermore, for the same reason, when the shape of section of cells 2, 7 cut along a plane perpendicular to the central axis is tetragonal or hexagonal, the ratio (d/D) of the representative inner diameter (d) of inner wall 4, 9 to the representative outer diameter of honeycomb structure 10 or foam structure 20 is preferably not more than 0.5, and when the shape of section of cells 2, 7 cut along a plane perpendicular to the central axis is triangle or wavy shape, the ratio (d/D) of the representative inner diameter (d) of inner wall 4, 9 to the representative outer diameter of honeycomb structure 10 or foam structure 20 is preferably not more than 0.8.

When the shape of section of the cell structure cut along a plane perpendicular to the central axis is non-circular (for example, when the section is oval and the cavity has the shape of rectangle as shown in FIGS. 3(a) and (b)), the inner diameter and the outer diameter thereof is shown by the representative inner diameter and the representative outer diameter as mentioned above.

Here, the representative outer diameter means the diameter of the largest inscribed circle which is inscribed with outer profile of the cell structure 10, 20 as shown in FIG. 5(d), and the representative inner diameter means the diameter of the largest circumscribed circle which is circumscribed about inner profile of inner wall 4, 9 as shown in FIG. 5(e). As aforementioned, the central axis of cell structure 10, 20 may not necessarily agree with that of cavity 3, 8 (inner wall 4, 9).

In addition to the above basic construction, the cell structure of the present invention is preferably reinforced as mentioned below in order to further improve the isostatic breaking strength. For convenience, explanation will be made on the honeycomb structure, but the same thing is applicable to the foam structure.

Figure 6:
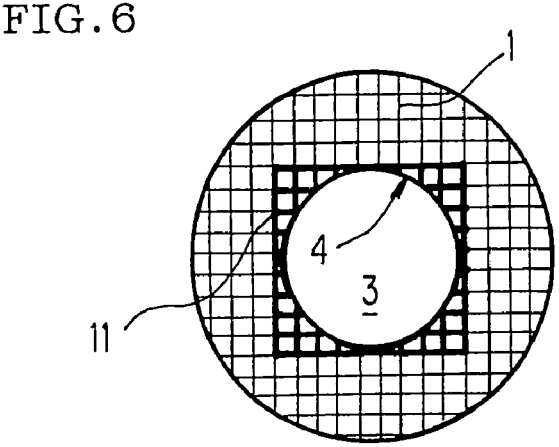
FIG. 6 is a sectional view of the honeycomb structure which is cut along a plane perpendicular to the central axis and which is the third embodiment of the cell structure of the present invention.

FIG. 6 is a sectional view of a honeycomb structure which is the third embodiment of the cell structure of the present invention and which is cut along a plane perpendicular to the central axis.

As shown in FIG. 6, the honeycomb structure of the third embodiment is constructed in such a manner that thickness of partition walls positioned at a given distance from inner wall 4 in diameter direction (the first reinforcing partition wall 11) among partition walls 1 is larger than that of other partition walls (ordinary partitions walls 1). Such honeycomb structure of the third embodiment can be produced by extrusion molding using a properly designed die. The same thing is applicable to the production of honeycomb structures of the fourth to twenty-third embodiments mentioned hereinafter. In the present invention, the portion of wall present between cells of a foam structure is called "intercellular wall 1a" in correspondence to the partition wall of the above honeycomb structure (see FIG. 4).

Figure 7:
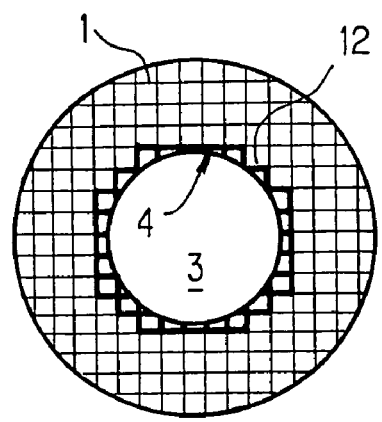
FIG. 7 is a sectional view of the honeycomb structure which is cut along a plane perpendicular to the central axis and which is the fourth embodiment of the cell structure of the present invention.

FIG. 7 is a sectional view of a honeycomb structure which is cut along a plane perpendicular to the central axis and which is the fourth embodiment of the cell structure of the present invention.

As shown in FIG. 7, the honeycomb structure of the fourth embodiment is one modification of the honeycomb structure of the third embodiment, and is constructed in such a manner that thickness of the partition wall closest to inner wall 4 (the second reinforcing partition wall 12) among partition walls 1 is larger than that of other partition walls (ordinary partitions walls 1).

Figure 8:
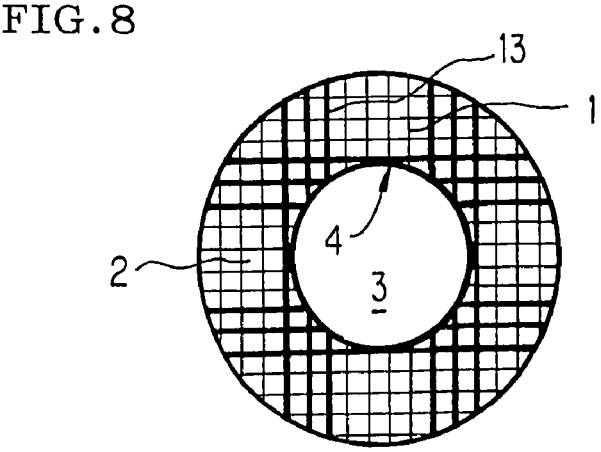
FIG. 8 is a sectional view of the honeycomb structure which is cut along a plane perpendicular to the central axis and which is the fifth embodiment of the cell structure of the present invention.

FIG. 8 is a sectional view of a honeycomb structure which is cut along a plane perpendicular to the central axis and which is the fifth embodiment of the cell structure of the present invention.

As shown in FIG. 8, the honeycomb structure of the fifth embodiment is constructed in such a manner that when the section formed by cutting cell 2 along a plane perpendicular to the central axis is tetragonal, thickness of at least one partition wall (the third reinforcing partition wall 13) which contacts with inner wall 4 or the tip of which contacts with inner wall 4 is larger than that of other partition walls (ordinary partition walls 1) among the partition walls 1.

Figure 9:
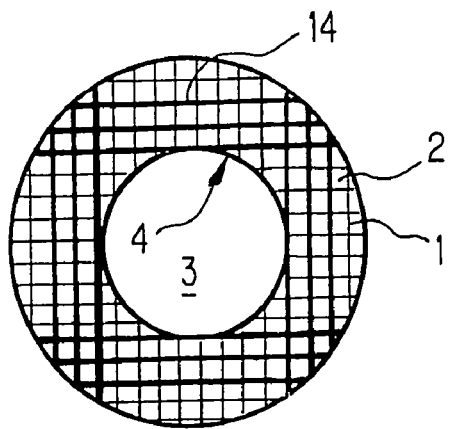
FIG. 9 is a sectional view of the honeycomb structure which is cut along a plane perpendicular to the central axis and which is the sixth embodiment of the cell structure of the present invention.

FIG. 9 is a sectional view of a honeycomb structure which is cut along a plane perpendicular to the central axis and which is the sixth embodiment of the cell structure of the present invention.

As shown in FIG. 9, the honeycomb structure of the sixth embodiment is constructed in such a manner that when the section formed by cutting cell 2 along a plane perpendicular to the central axis is tetragonal, thickness of at least one partition wall (the fourth reinforcing partition wall 14) which contacts with inner wall 4 or is apart from inner wall 4 outwardly is larger than that of other partition walls (ordinary partition walls 1) among the partition walls 1.

Figure 10:
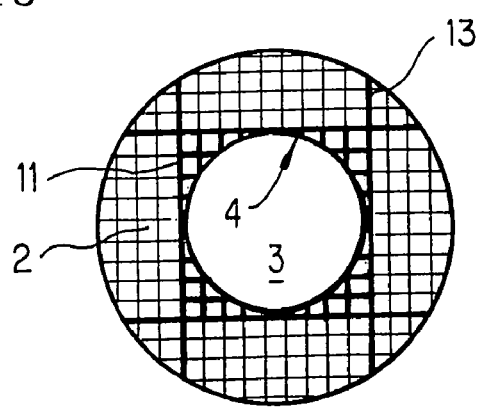
FIG. 10 is a sectional view of the honeycomb structure which is cut along a plane perpendicular to the central axis and which is the seventh embodiment of the cell structure of the present invention.

FIG. 10 is a sectional view of a honeycomb structure which is cut along a plane perpendicular to the central axis and which is the seventh embodiment of the cell structure of the present invention.

As shown in FIG. 10, the honeycomb structure of the seventh embodiment is a combination of the third embodiment and the fifth embodiment. That is, the honeycomb structure is constructed in such a manner that cells 2 are partitioned with the first reinforcing partition wall 11 and the third reinforcing partition wall 13.

Figure 11:
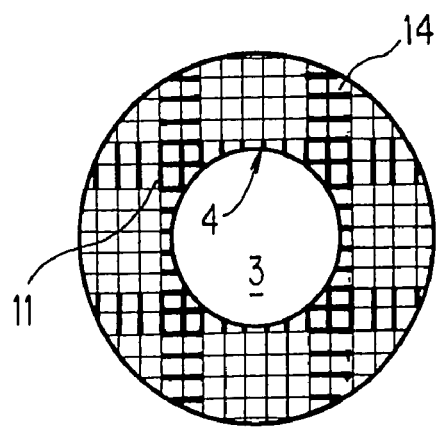
FIG. 11 is a sectional view of the honeycomb structure which is cut along a plane perpendicular to the central axis and which is the eighth embodiment of the cell structure of the present invention.

FIG. 11 is a sectional view of a honeycomb structure which is cut along a plane perpendicular to the central axis and which is the eighth embodiment of the cell structure of the present invention.

As shown in FIG. 11, the honeycomb structure of the eighth embodiment is a combination of the third embodiment and the sixth embodiment. That is, the honeycomb structure is constructed in such a manner that cells 2 are partitioned with the first reinforcing partition wall 11 and the fourth reinforcing partition wall 14.

Figure 12:
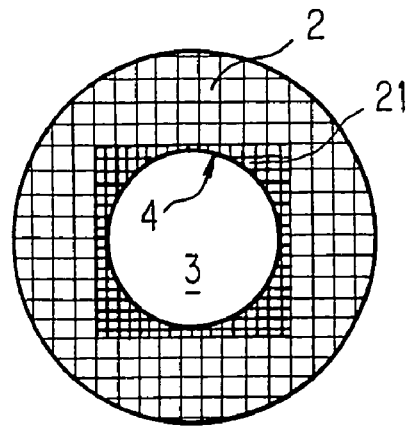
FIG. 12 is a sectional view of the honeycomb structure which is cut along a plane perpendicular to the central axis and which is the ninth embodiment of the cell structure of the present invention.

FIG. 12 is a sectional view of a honeycomb structure which is cut along a plane perpendicular to the central axis and which is the ninth embodiment of the cell structure of the present invention.

As shown in FIG. 12, the honeycomb structure of the ninth embodiment is constructed in such a manner that a cell density of a given number of cells (the first reinforcing cells 21) positioned at a given distance from inner wall 4 in diameter direction is higher than that of the cells other than the first reinforcing cells 21 (ordinary cells 2). The cell density here means a conception shown by the unit of "cpsi (cell per square inch)" in the case of honeycomb structure and the unit of "ppi (piece per inch)" in the case of foam structure.

Figure 13:
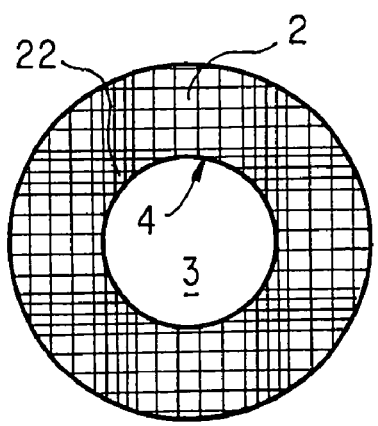
FIG. 13 is a sectional view of the honeycomb structure which is cut along a plane perpendicular to the central axis and which is the tenth embodiment of the cell structure of the present invention.

FIG. 13 is a sectional view of a honeycomb structure which is cut along a plane perpendicular to the central axis and which is the tenth embodiment of the cell structure of the present invention.

As shown in FIG. 13, the honeycomb structure of the tenth embodiment is constructed in such a manner that a cell density of a given number of cells (the second reinforcing cells 21) positioned at a given distance from inner wall 4 in diameter direction is higher than that of the cells other than the second reinforcing cells 22 (ordinary cells 2).

Figure 14:
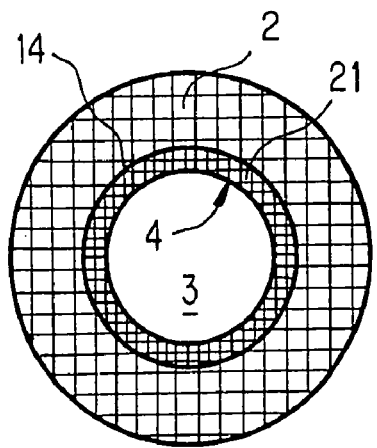
FIG. 14 is a sectional view of the honeycomb structure which is cut along a plane perpendicular to the central axis and which is the eleventh embodiment of the cell structure of the present invention.
Figure 15:
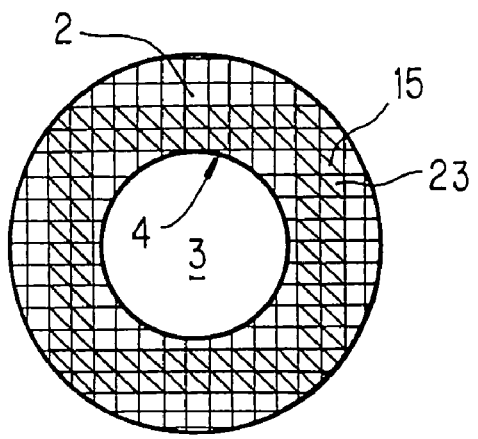
FIG. 15 is a sectional view of the honeycomb structure which is cut along a plane perpendicular to the central axis and which is the twelfth embodiment of the cell structure of the present invention.
Figure 16:
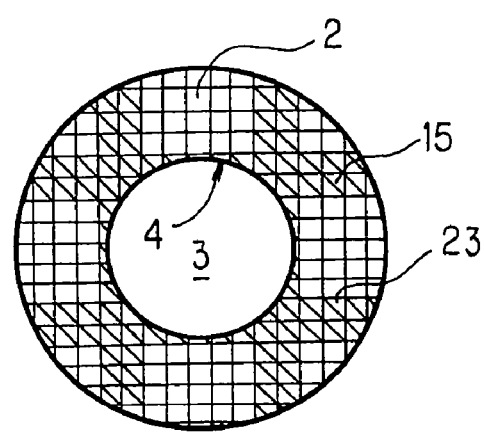
FIG. 16 is a sectional view of the honeycomb structure which is cut along a plane perpendicular to the central axis and which is the thirteenth embodiment of the cell structure of the present invention.
Figure 17:
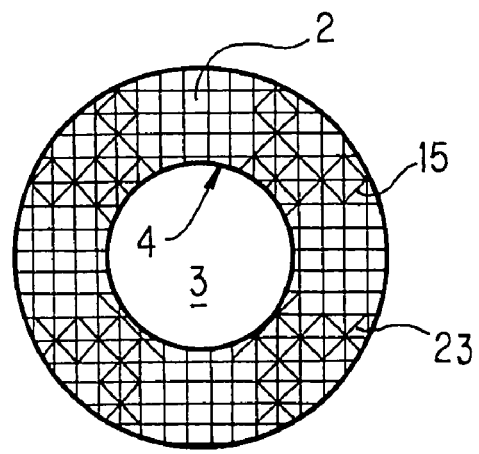
FIG. 17 is a sectional view of the honeycomb structure which is cut along a plane perpendicular to the central axis and which is the fourteenth embodiment of the cell structure of the present invention.
Figure 18:
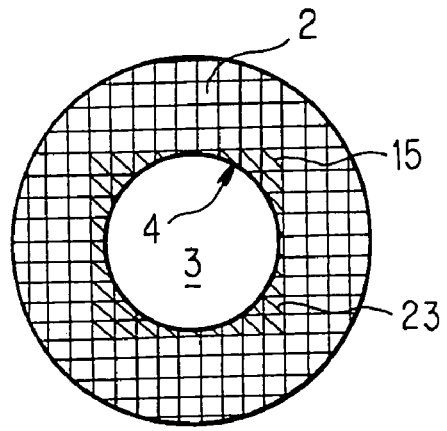
FIG. 18 is a sectional view of the honeycomb structure which is cut along a plane perpendicular to the central axis and which is the fifteenth embodiment of the cell structure of the present invention.
Figure 19:
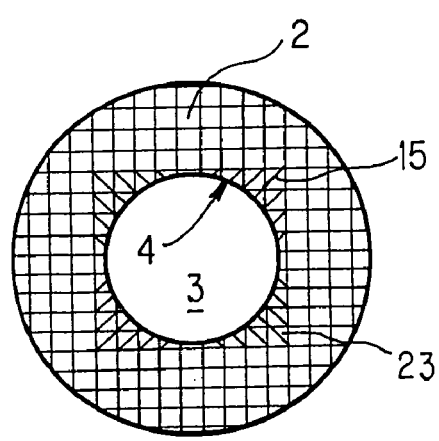
FIG. 19 is a sectional view of the honeycomb structure which is cut along a plane perpendicular to the central axis and which is the sixteenth embodiment of the cell structure of the present invention.
Figure 20:
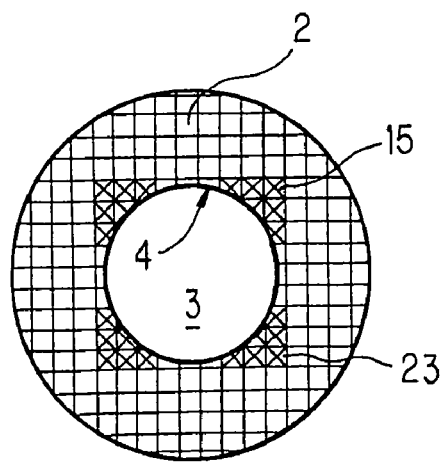
FIG. 20 is a sectional view of the honeycomb structure which is cut along a plane perpendicular to the central axis and which is the seventeenth embodiment of the cell structure of the present invention.

FIG. 14 is a sectional view of a honeycomb structure which is cut along a plane perpendicular to the central axis and which is the eleventh embodiment of the cell structure of the present invention.

As shown in FIG. 14, the honeycomb structure of the eleventh embodiment is a combination of the sixth embodiment and the ninth embodiment. That is, the fourth reinforcing partition wall 14 is formed concentrically with inner wall 4 and further reinforcing cell 21 are formed between the fourth reinforcing partition wall 14 and inner wall 4.

FIGS. 15-20 are sectional views of honeycomb structures which are cut along a plane perpendicular to the central axis and which are the twelfth to seventeenth embodiments of the cell structure of the present invention.

As shown in FIGS. 15-20, the honeycomb structures of the twelfth to seventeenth embodiments are constructed in such a manner that a given number of cells (the third reinforcing cells 23) positioned at a given distance from the central axis in diameter direction is partitioned with at least one partition wall (the fifth reinforcing partition wall 15) which divides the inside of the cells.

FIG. 21(a) is a sectional view of a honeycomb structure which is cut along a plane perpendicular to the central axis and which is the eighteenth embodiment of the cell structure of the present invention, and FIG. 21(b) is a partially enlarged view thereof.

As shown in FIGS. 21(a) and (b), the honeycomb structure of the eighteenth embodiment is constructed with forming a thick wall part 30 at the portion where the partition wall (the sixth reinforcing partition wall 16) contacts with inner wall 4. This thick wall part 30 can be formed by rounding, curving, padding, etc. (FIGS. 21(a) and (b) show the case where padding is carried out).

As shown in FIG. 22, other methods for forming the thick wall part 30 include rounding and curving as mentioned above. One may take the method disclosed in U.S. Pat. No. 6,159,431 as an example of these methods.

FIG. 23 is a sectional view of a honeycomb structure which is cut along a plane perpendicular to the central axis and which is the nineteenth embodiment of the cell structure of the present invention.

As shown in FIG. 23, the honeycomb structures of the nineteenth embodiment is constructed in such a manner that a given number of cells (the fourth reinforcing cells 24) positioned at a given distance from inner wall 4 in diameter direction among cells 2 are filled with a material for filling the cells 40 in their cell passages.

In this case, as a material for filling the cells 40, mention may be made of materials of the partition walls. In this embodiment, since the cells are filled around the cavity at the end face of the honeycomb structure, area of flat region is conspicuously increased, which is more preferred from the point of sealing of fluid.

Figure 24:
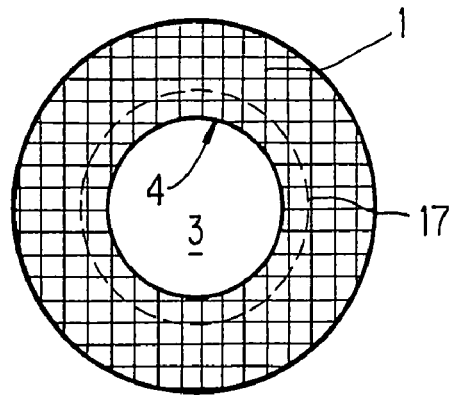
FIG. 24 is a sectional view of the honeycomb structure which is cut along a plane perpendicular to the central axis and which is the twentieth embodiment of the cell structure of the present invention.

FIG. 24 is a sectional view of a honeycomb structure which is cut along a plane perpendicular to the central axis and which is the twentieth embodiment of the cell structure of the present invention.

As shown in FIG. 24, the honeycomb structure of the twentieth embodiment is constructed in such a manner that partition wall (the seventh reinforcing partition wall 17) positioned at a given distance from inner wall 4 in diameter direction among partition walls 1 is made to be denser than other partition walls (ordinary partition walls 1). In general, partition walls mainly composed of cordierite are formed in porous state with having many pores therein. Therefore, the isostatic breaking strength can be improved by lowering the porosity of the partition walls than that of the ordinary partition walls to perform densification. In this case, since the isostatic breaking strength can be improved without increasing the thickness of the partition walls, a fluid passing through cells, for example, exhaust gas, can be inhibited from increase of passing resistance.

In this case, the densification is preferably carried out so as to give a porosity in the range of 5-35%. If the porosity is less than 5%, isostatic breaking strength is improved, but thermal shock resistance may deteriorate. On the other hand, if it exceeds 35%, the effect to improve isostatic breaking strength is sometimes insufficient. The method for densification includes, for example, a method of coating a part of the material of the partition wall on the partition walls after extrusion molding of the honeycomb structure and then firing the honeycomb structure.

Even if the porosity is more than 35%, strength can be maintained by increasing the thickness of the partition walls or by employing a reinforced structure. Moreover, when both ends of the cells of the honeycomb structure are alternately sealed to make a filter structure, a filtering function is sometimes given to the partition walls by increasing the porosity to more than 45%, and in this case, strength can be maintained by increasing the thickness of the partition walls. Furthermore, in case the partition walls and the inner wall are formed of materials having the same porosity, the inner wall may be densified by coating or the like after formation of the cell structure to prevent the fluid from passing through the inner wall. Further, the cell structure of this embodiment can also be used as a substrate of separating membranes for hydrogen or oxygen utilized in a fuel cell system and the like. In this case, when separation is carried out between cell and cavity through the inner wall, a given porosity may be imparted to the inner wall.

Figure 25:
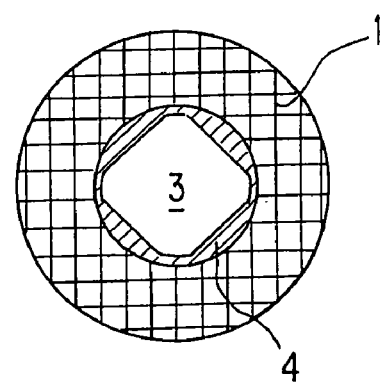
FIG. 25 is a sectional view of the honeycomb structure which is cut along a plane perpendicular to the central axis and which is the twenty-first embodiment of the cell structure of the present invention.

FIG. 25 is a sectional view of a honeycomb structure which is cut along a plane perpendicular to the central axis and which is the twenty-first embodiment of the cell structure of the present invention.

As shown in FIG. 25, the honeycomb structure of the twenty-first embodiment is one modification of the honeycomb structure of the twentieth embodiment, and has such a construction that thickness of a portion of inner wall 4 to which a higher pressure is internally applied to the surface of the inner wall is increased to perform further reinforcement.

Figure 26:
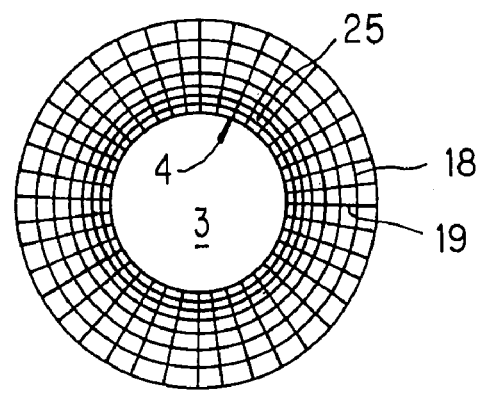
FIG. 26 is a sectional view of the honeycomb structure which is cut along a plane perpendicular to the central axis and which is the twenty-second embodiment of the cell structure of the present invention.

FIG. 26 is a sectional view of a honeycomb structure which is cut along a plane perpendicular to the central axis and which is the twenty-second embodiment of the cell structure of the present invention.

As shown in FIG. 26, in the honeycomb structure of the twenty-second embodiment, the partition walls are composed of the partition wall (the eighth reinforcing partition wall 18) which is concentric with inner wall 4 and partition wall (the ninth reinforcing partition wall 19) which are formed radially from the central axis. In this case, the honeycomb structure is preferably constructed in such a manner that among the cells (the fifth reinforcing cells 25) formed by the eighth reinforcing partition wall 18 and the ninth reinforcing partition wall 19, cell density of a given number of cells positioned at a given distance from the central axis in diameter direction is higher than that of other cells.

Figure 27:
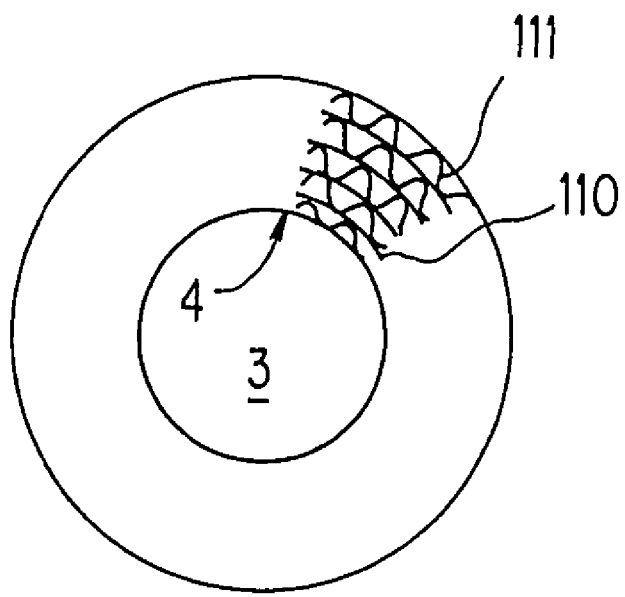
FIG. 27 is a sectional view of the honeycomb structure which is cut along a plane perpendicular to the central axis and which is the twenty-third embodiment of the cell structure of the present invention.

FIG. 27 is a sectional view of a honeycomb structure which is cut along a plane perpendicular to the central axis and which is the twenty-third embodiment of the cell structure of the present invention.

As shown in FIG. 27, in the honeycomb structure of the twenty-third embodiment, the partition walls are composed of the partition wall (the tenth reinforcing partition wall 110) which is concentric with inner wall 4 and wavy partition wall (the eleventh reinforcing partition wall 111). By employing such construction, isostatic breaking strength of the cells are improved by the effect of curvature.

Figure 28:
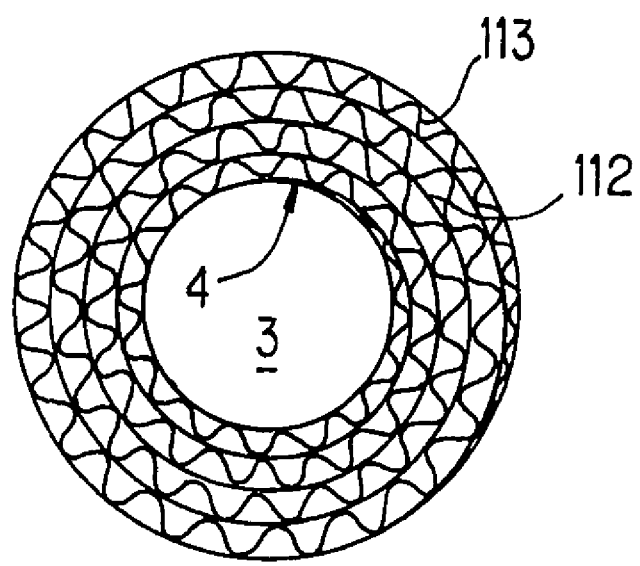
FIG. 28 is a sectional view of the honeycomb structure which is cut along a plane perpendicular to the central axis and which is the twenty-fourth embodiment of the cell structure of the present invention.

FIG. 28 is a sectional view of a honeycomb structure which is cut along a plane perpendicular to the central axis and which is the twenty-fourth embodiment of the cell structure of the present invention.

As shown in FIG. 28, in the honeycomb structure of the twenty-fourth embodiment, the partition walls are composed of the partition wall (the twelfth reinforcing partition wall 112) which is concentric with inner wall 4 and corrugated partition wall (the thirteenth reinforcing partition wall 113). In this case, the isostatic breaking strength is also improved as in the case of the honeycomb structure of the twenty-third embodiment.

The honeycomb structure or foam structure used in the present invention preferably comprise at least one component selected from the group consisting of the following component (a), component (b), component (c) and component (d):

(a): ceramic materials containing at least one compound selected from the group consisting of cordierite, alumina, mullite, lithium aluminum silicate, aluminum titanate, titania, zirconia, silicon nitride, aluminum nitride, silicon carbide, calcium silicate, zirconium phosphate, zirconyl phosphate, ceria, yttria and magnesia, (b): ceramic materials containing composites of the compounds shown in (a), (c): heat resistant metals, (d): adsorptive materials containing at least one selected from the group consisting of active carbon, silica gel and zeolite.

In the present invention, the inner wall may comprise a material higher in mechanical strength than the partition walls or intercellular walls. As these materials, composite materials may be used, for example, the partition walls or intercellular walls are formed of a cordierite material and the inner wall is formed of mullite, whereby strength of the inner wall can be made higher than that of the partition walls. In this case, the cell structure may be formed by simultaneously and integrally extrusion molding the two different materials or a material different from that of the partition walls or intercellular walls may be coated to form the inner wall. By employing such construction, isostatic breaking strength of the structure can be further improved.

Furthermore, it is preferred that a reinforcing material concentric with the inner wall is provided on the inner surface side of the inner wall, and a cushioning member having compressibility and elasticity (for example, a mat containing ceramic fibers) is provided in compressed state between the inner surface of the inner wall and the reinforcing material.

By employing such construction, a pressure acts on the inner wall from the reinforcing material through the compressive cushioning member, whereby influence of external pressure acting from the outer peripheral surface of the cell structure can be relaxed. On the other hand, JP-A-62-298456 proposes a spiral ceramic honeycomb structure which is made by superposing a corrugated plate having a hollow portion (cavity) and a flat plate one upon another and forming them into a spiral form and in which a core material is provided in the hollow portion. However, even when the honeycomb structure disclosed in the above publication is constructed so that the flat plate is disposed on the inner side of the cavity, generally the flat plate has a thickness similar to that of the corrugated plate and cannot maintain such a stiffness and strength as sufficient as an inner wall. Moreover, since the core material is provided directly inside the hollow portion, the honeycomb structure may be ruptured due to contact with the core material. Furthermore, in a honeycomb structure having cells of polygonal section, unless the inner wall is present in the cavity of the honeycomb structure, the partition walls open and are exposed at the hollow portion and are broken in case the core material is contacted with the inner surface of the hollow portion. Even if a cushioning member is allowed to be present between the core material and the partition walls, the cushioning material causes breakage of the partition walls. On the other hand, in the case of using the cell structure of this embodiment, it is provided with a strong inner wall and hence occurrence of the above problems can be avoided.

Figure 29:
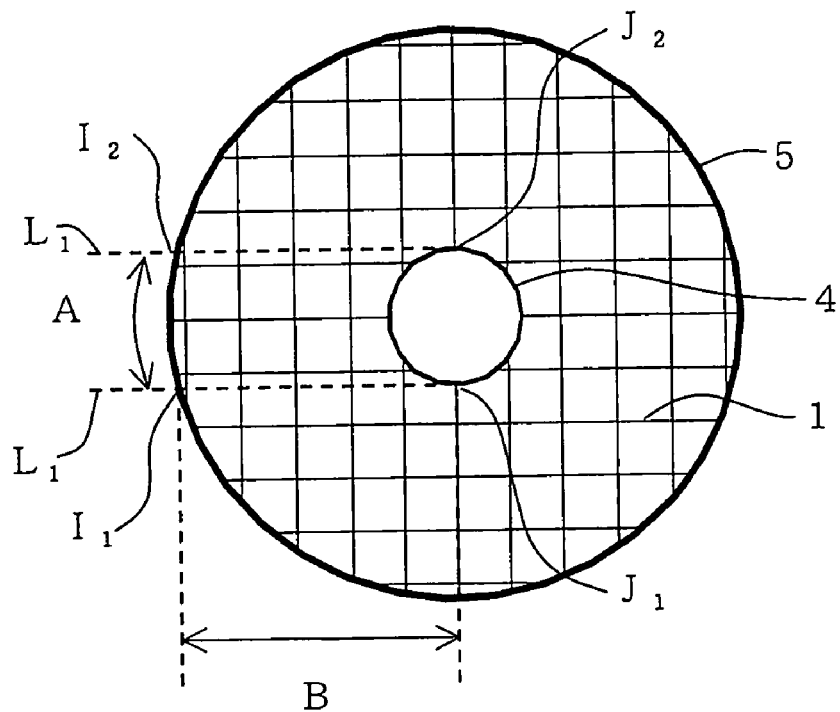
FIG. 29 is a sectional view of the honeycomb structure which is cut along a plane perpendicular to the central axis and which is further another embodiment of the cell structure of the present invention.
Figure 50:
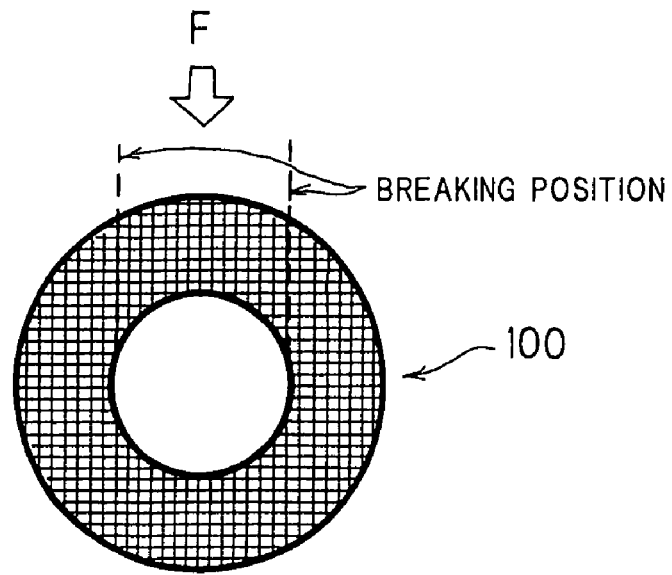
FIG. 50 is a sectional view of a conventional honeycomb structure having a cavity which is cut along a plane perpendicular to the central axis and which shows the state of breakage.
Figure 51A:
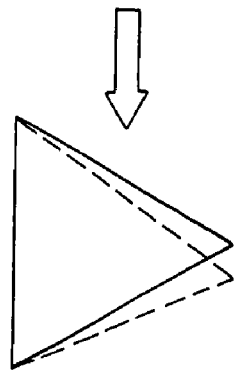
FIGS. 51($a$)-($c$) schematically shows behavior of deformation and breakage of cells of the structure due to pressure applied to outer peripheral surface of the structure.
Figure 51B:
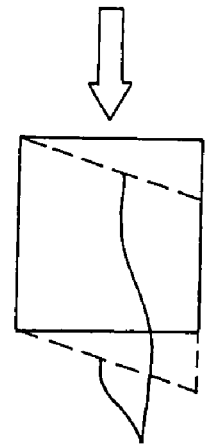
Figure 51C:
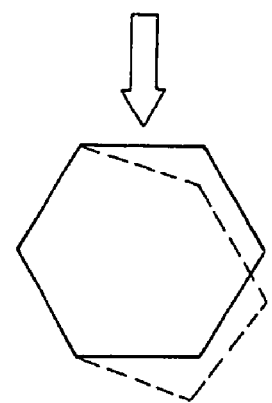

The strength of cell structure having a cavity will be investigated from another angle. As aforementioned, a cell structure having a cavity is often broken due to the breaking behaviors shown in FIG. 50 and FIG. 51. Therefore, it is important for improving the strength of the cell structure to narrow the breaking width (A) and lengthen the breaking length (B) shown in FIG. 29. Here, when points of intersection of the outer wall 5 and two tangent lines $L_1$ and $L_2$ which contact with inner contour of the inner wall 4 and extend in parallel to longitudinal direction of the partition wall 1 are indicated by $I_1$ and $I_2$ at the section formed by cutting along a plane perpendicular to the central axis as shown in FIG. 29, the breaking width (A) is a length of a line formed by linking $I_1$ and $I_2$ along the outer wall and the breaking length (B) is an average of the distances from the points of contact $J_1$ and $J_2$ of the tangent lines $L_1$ and $L_2$ with the inner contour of the inner wall 4 to the points of intersection $I_1$ and $I_2$ of the tangent lines $L_1$ and $L_2$ with the closest outer wall.

Figure 30:
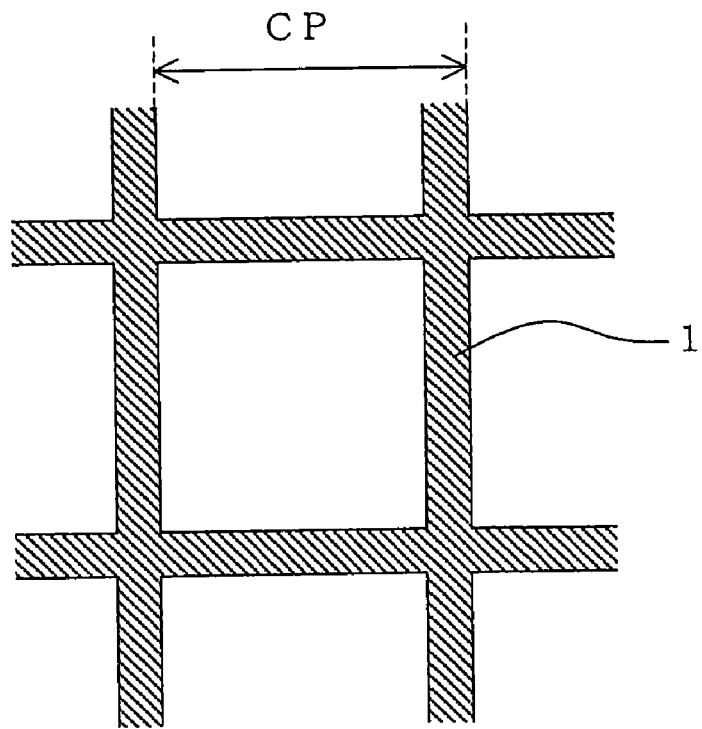
FIG. 30 is a partially enlarged sectional view of the honeycomb structure which is cut along a plane perpendicular to the central axis and which shows one example of cell pitch.
Figure 31:
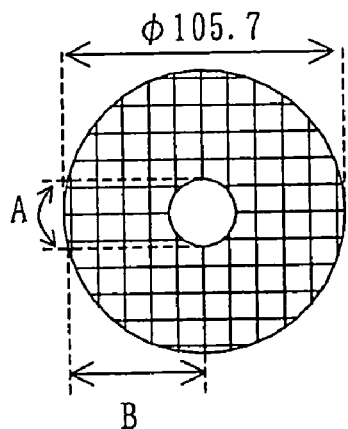
FIG. 31-FIG. 48 are sectional views of the honeycomb structures which are cut along a plane perpendicular to the central axis and which are further embodiments of the cell structures of the present invention.
Figure 32:
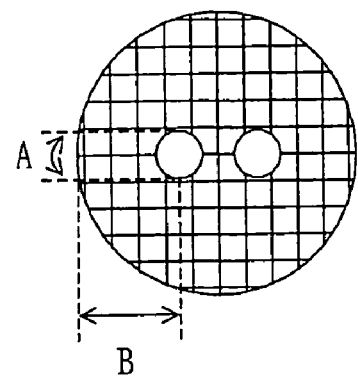
Figure 33:
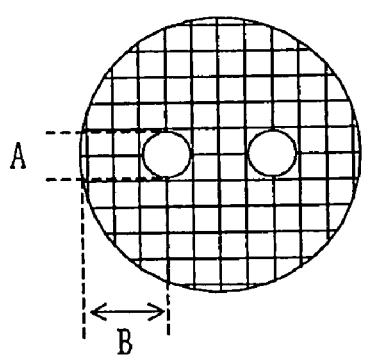
Figure 34:
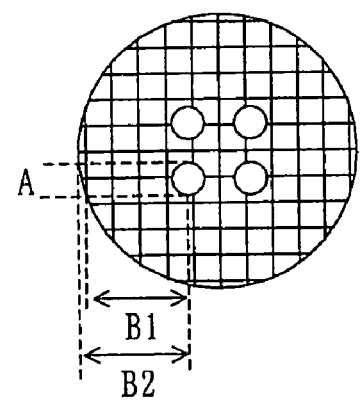
Figure 35:
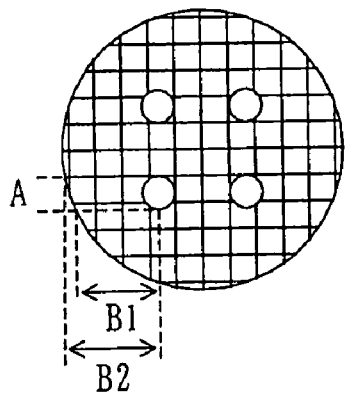
Figure 36:
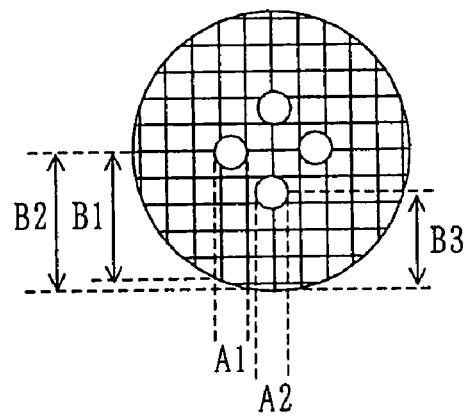
Figure 37:
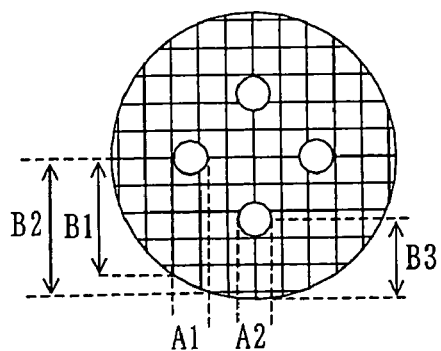
Figure 38:
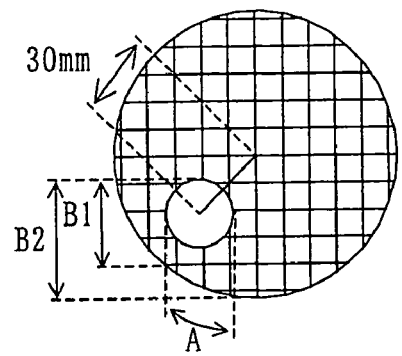
Figure 39:
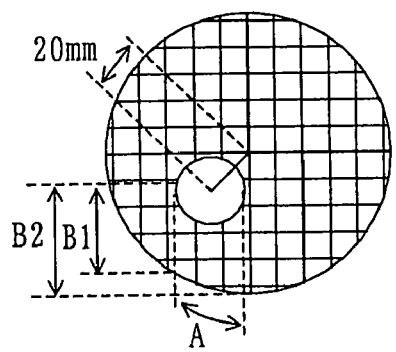
Figure 40:
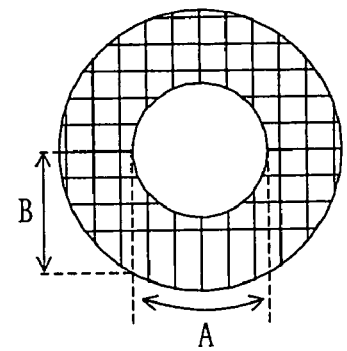
Figure 41:
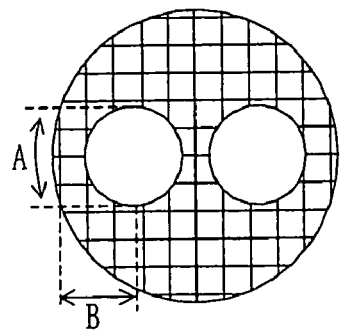
Figure 42:
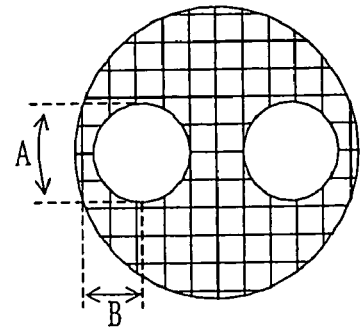
Figure 43:
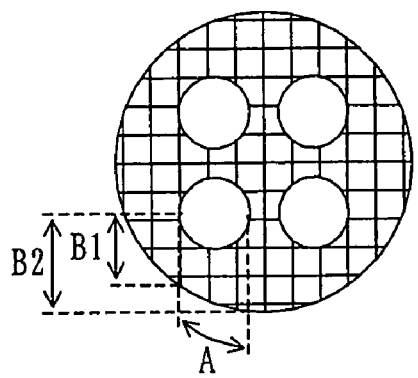
Figure 44:
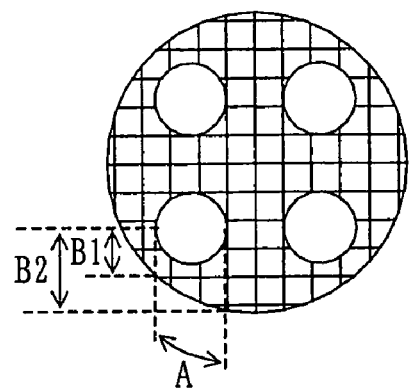
Figure 45:
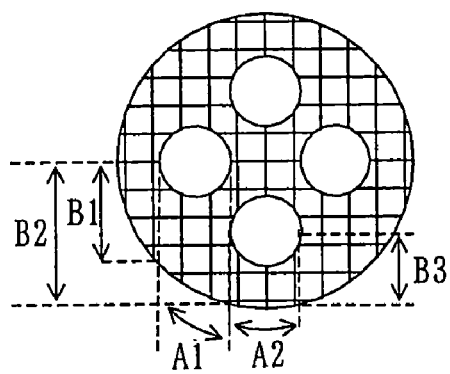
Figure 46:
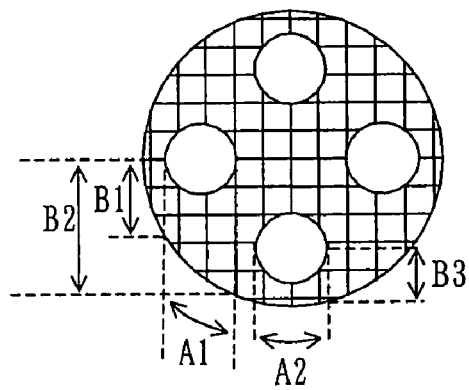
Figure 47:
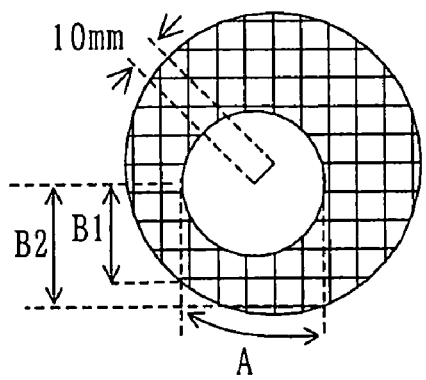
Figure 48:
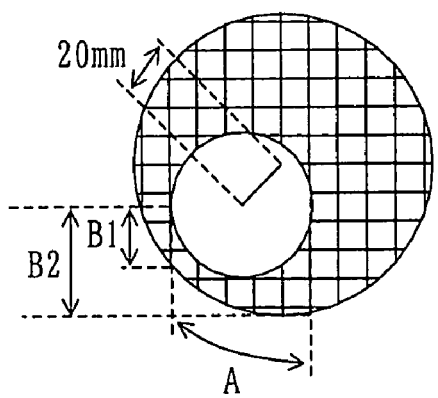

Further, in order to inhibit the breakage due to the above breakage behavior, cell pitch (CP) and thickness (T) of partition walls are also important elements. The cell pitch is a length per one cell at the section formed by cutting along a plane perpendicular to the central axis, and, for example, in the case of a cell having a tetragonal section, the cell pitch means the value of CP shown in FIG. 30. With decrease in cell pitch (CP), the breaking strength increases, and with increase in thickness (T) of partition walls, the breaking strength increases.

As a result of detailed examination of the relations of B, A, CP and T with isostatic breaking strength, it has been found that the isostatic breaking strength greatly interrelate with strength index shown by the following formula.

Strength index=$(T \text{ (mm)}/CP \text{ (mm)})^2 \times (B \text{ (mm)}/A \text{ (mm)})_2$ Furthermore, it has been found that in soft canning method employed in using, for example, an ultra-thin wall honeycomb structure as a carrier in order to prevent breakage of the cell structure which may occur when a cushioning material or the like is wound around the outer wall of the cell structure and this cell structure is stored (canned) in a container such as a can, the isostatic breaking strength of the honeycomb structure is preferably not lower than about 0.49 MPa, and in canning method for usual honeycomb structure, the isostatic breaking strength is preferably not lower than about 1.03 MPa and more preferably not lower than about 1.96 MPa. Without reinforcement such as disposition of reinforcing partition walls as aforementioned, an isostatic breaking strength of not lower than about 0.49 MPa can be obtained by employing a strength index of not less than 0.02, an isostatic breaking strength of not lower than about 1.03 MPa can be obtained by employing a strength index of not less than 0.04, and an isostatic breaking strength of not lower than about 1.96 MPa can be obtained by employing a strength index of not less than about 0.06. When the strength index is not less than 0.02 and furthermore reinforcement such as disposition of reinforcing partition walls is made, the breaking strength is further improved, which is preferred.

The relation between the abovementioned B/A and the isostatic breaking strength will be investigated from further another angle. In the case of cell structures having the same thickness (T) of partition wall and cell pitch (CP) and having one cavity of the same shape, the isostatic breaking strength is highest and the B/A is also largest when the cavity is present at the center of the cell structure. When an investigation is carried out on further increase of B/A with the same cavity size, it has been found that B/A can be further increased and the isostatic breaking strength can be improved by disposing two or more cavities of specific sizes at specific positions.

FIGS. 31-48 show examples of embodiments where size of the cavity and position of the cavity are changed in the case of the number of the cavity being one, two and four. The calculated B/A of these cell structures is shown in Table 1 and Table 2. It can be seen from the results that B/A can be increased by providing a plurality of relatively small cavities near the central axis. In Tables 1 and 2, sectional area of the section cut along a plane perpendicular to the central axis is used as the volume of the cavities. Furthermore, in FIGS. 31-48, length A is a length of the circular arc in the range shown, and when this length is one, it is indicated by (A), and when there are two lengths of the circular arcs in each cavity, they are indicated by (A1) and (A2). The distance B is a linear distance in the range shown in each of FIGS. 31-48, and when this distance is one for one cavity, it is indicated by (B), and when there are two distances B for one cavity, they are indicated by (B1) and (B2), and the average of them is referred to as B. Further, when there is a different distance B for another circular arc, this is indicated by (B3). The B/A is calculated for each cavity, and the minimum value is taken as the value of B/A of each cell structure.

Accordingly, when a cell structure of a given shape which has one cavity of a given volume at the position to give the maximum B/A value (namely, at the center of the cell structure) is referred to as cell structure X, and when a cell structure which is the same as the cell structure X, except that it has a plurality of cavities having a total volume equal to the volume of the cavity of the cell structure X is referred to as cell structure Y, the cell structure Y can have an isostatic breaking strength higher than that of the cell structure X by disposing a plurality of the cavities so as to give a B/A greater than the B/A value of the cell structure X. Thus, this is a preferred embodiment. Moreover, it is preferred from the point of further improvement of isostatic breaking strength to provide a plurality of cavities so as to give a B/A value at least 1.5 times the B/A value of the cell structure X and/or provide four or more cavities. In this preferred embodiment, it is further preferred that the sectional shape of the cavity and outer peripheral shape of the section of the cell structure are circular.

TABLE 1

| No. of Figs. | | | 31 | 32 | 33 | 34 | 35 | 36 | 37 | 38 | 39 |
|---|---|---|---|---|---|---|---|---|---|---|---|
| Remark | | | | | | | | | | Eccentric cavity | Eccentric cavity |
| Diameter of cell structure | | mm | 105.7 | 105.7 | 105.7 | 105.7 | 105.7 | 105.7 | 105.7 | 105.7 | 105.7 |
| Diameter of cavity | | mm | 25.4 | 17.96 | 17.96 | 12.7 | 12.7 | 12.7 | 12.7 | 25.4 | 25.4 |
| Number of cavities | | | 1 | 2 | 2 | 4 | 4 | 4 | 4 | 1 | 1 |
| Total sectional area of cell structure (X) | | cm$^2$ | 87.7 | 87.7 | 87.7 | 87.7 | 87.7 | 87.7 | 87.7 | 87.7 | 87.7 |
| Sectional area of cavity (Y) | | cm$^2$ | 5.1 | 5.1 | 5.1 | 5.1 | 5.1 | 5.1 | 5.1 | 5.1 | 5.1 |
| Actual area of cell structure (Z = X − Y) | | cm$^2$ | 82.7 | 82.7 | 82.7 | 82.7 | 82.7 | 82.7 | 82.7 | 82.7 | 82.7 |
| Cavity1 | Length of circular arc (A or A1) | mm | 25.7 | 18.1 | 18.1 | 13.0 | 13.4 | 13.4 | 14.2 | 28.3 | 26.7 |
| | Distance to outer wall (B or B1) | mm | 51.3 | 38.1 | 33.1 | 38.5 | 31.4 | 47.9 | 43.9 | 19.3 | 31.4 |
| | Distance to outer wall (B or B1) | mm | 51.3 | 38.1 | 33.1 | 41.3 | 35.6 | 52.0 | 50.1 | 31.0 | 38.7 |
| | (B) or (average of B1 and B2) | mm | 51.3 | 38.1 | 33.1 | 39.9 | 33.5 | 49.9 | 47.0 | 25.1 | 35.0 |
| | (B/A) | | 2.0 | 2.1 | 1.8 | 3.1 | 2.5 | 3.7 | 3.3 | 0.9 | 1.3 |
| Cavity2 | Length of circular arc (A2) | mm | | | | | | 12.7 | 12.7 | | |
| | Distance to outer wall (B3) | mm | | | | | | 36.4 | 29.3 | | |
| | Distance to outer wall (B3) | mm | | | | | | 36.4 | 29.3 | | |
| | B | mm | | | | | | 36.4 | 29.3 | | |
| | (B/A) | | | | | | | 2.9 | 2.3 | | |
| | Minimum value of (B/A) | | 2.0 | 2.1 | 1.8 | 3.1 | 2.5 | 2.9 | 2.3 | 0.9 | 1.3 |

TABLE 2

| No. of Figs. | | | 40 | 41 | 42 | 43 | 44 | 45 | 46 | 47 | 48 |
|---|---|---|---|---|---|---|---|---|---|---|---|
| Remark | | | | | | | | | | Eccentric cavity | Eccentric cavity |
| Diameter of cell structure | | mm | 105.7 | 105.7 | 105.7 | 105.7 | 105.7 | 105.7 | 105.7 | 105.7 | 105.7 |
| Diameter of cavity | | mm | 50.8 | 35.92 | 35.92 | 25.4 | 25.4 | 25.4 | 25.4 | 50.8 | 50.8 |
| Number of cavities | | | 1 | 2 | 2 | 4 | 4 | 4 | 4 | 1 | 1 |
| Total sectional area of cell structure (X) | | cm$^2$ | 87.7 | 87.7 | 87.7 | 87.7 | 87.7 | 87.7 | 87.7 | 87.7 | 87.7 |
| Sectional area of cavity (Y) | | cm$^2$ | 20.3 | 20.3 | 20.3 | 20.3 | 20.3 | 20.3 | 20.3 | 20.3 | 20.3 |
| Actual area of cell structure (Z = X − Y) | | cm$^2$ | 67.5 | 67.5 | 67.5 | 67.5 | 67.5 | 67.5 | 67.5 | 67.5 | 67.5 |
| Cavity1 | Length of circular arc (A or A1) | mm | 53.0 | 36.7 | 36.7 | 27.4 | 28.7 | 29.6 | 33.6 | 53.7 | 56.0 |
| | Distance to outer wall (B or B1) | mm | 46.4 | 26.7 | 21.7 | 25.5 | 16.5 | 37.0 | 28.0 | 34.6 | 20.9 |
| | Distance to outer wall (B or B1) | mm | 46.4 | 26.7 | 21.7 | 34.9 | 29.2 | 51.4 | 49.2 | 42.5 | 37.5 |
| | (B) or (average of B1 and B2) | mm | 46.4 | 26.7 | 21.7 | 30.2 | 22.9 | 44.2 | 38.6 | 38.6 | 29.2 |
| | (B/A) | | 0.9 | 0.7 | 0.6 | 1.1 | 0.8 | 1.5 | 1.1 | 0.7 | 0.5 |
| Cavity2 | Length of circular arc (A2) | mm | | | | | | 25.7 | 25.7 | | |
| | Distance to outer wall (B3) | mm | | | | | | 26.3 | 19.2 | | |
| | Distance to outer wall (B3) | mm | | | | | | 26.3 | 19.2 | | |
| | B | mm | | | | | | 26.3 | 19.2 | | |
| | (B/A) | | | | | | | 1.0 | 0.7 | | |
| | Minimum value of (B/A) | | 0.9 | 0.7 | 0.6 | 1.1 | 0.8 | 1.0 | 0.7 | 0.7 | 0.5 |

FIGS. 49(a)-(d) are sectional views and a plan view which schematically show a die structure used in the first embodiment of the method for producing a cell structure according to the present invention.

As shown in FIGS. 49(a)-(d), this embodiment is a method for producing a cell structure having a plurality of cells partitioned with partition walls which comprises extruding a ceramic material 52 from a die 50 having a plurality of grooves formed in the form of slit 51 and firing the extruded product, characterized in that the ceramic material 52 is extruded from grooves formed in the form of slit 51 of die 50 in such a state as a press platen 53 of a given shape for the formation of an inner wall being provided above the central portion of an end face of die 50 on the side of ceramic material 52 being extruded and the extruded product is fired to produce a cell structure having a plurality of cells, a cavity piercing through a portion including the central axis or a given axis parallel to the central axis and an inner wall on the inner surface of the cavity.

In the die structure used in this embodiment, a press platen 54 for the formation of an outer wall is provided above the peripheral portion of the end face on the side of ceramic material 52 being extruded, a spacer 55 is provided to secure a space between die 50 and press platens 53, 54, and a bolt 56 and a nut 57 are provided to fix the press platen 53 for the formation of the inner wall on the die 50.

In this case, on the side of die 50 of ceramic material 52 being introduced, ceramic material 52 directly strikes on the back side of die 50 underneath the press platen 53 for the formation of inner wall, and hence ceramic material 52 becomes difficult to flow, which may cause non-uniform flowing of ceramic material 52 on the side of die 50 where the ceramic material 52 is introduced. Considering this problem, as shown in FIG. 49(d), it is preferred to provide a guide 58 for uniformly flowing ceramic material 52 underneath the press platen 53 for the formation of inner wall. The shape of guide 58 is not particularly limited so long as ceramic material 52 can be uniformly flowed, and, for example, it may be in the form of cone or hemisphere (dome) (FIG. 49(d) shows a guide of conical shape).

The second embodiment of the method for producing a cell structure according to the present invention will be explained below.

The second embodiment of the method for producing a cell structure according to the present invention employs a die structure shown in FIGS. 49(a)-(d) from which the press platen 53 for the formation of inner wall is removed (namely, in which the press platen 53 is not provided), and for convenience, explanation will be made using FIGS. 49(a)-(d). As shown in FIGS. 49(a)-(d), the second embodiment is a method for producing a cell structure having a plurality of cells partitioned with partition walls which comprises extruding a ceramic material 52 from a die 50 having a plurality of grooves formed in the form of slit 51 and firing the extruded product, characterized in that the ceramic material 52 is extruded from grooves formed in the form of slit 51 of die 50 in such a state that the grooves formed in the form of slit 51 positioned above the central portion of an end face of die 50 on the side of ceramic material 52 being extruded is masked (not shown) and is fired to produce a first cell structure (not shown) having a cavity to which the partition walls are bared, and a given coating material is coated on the inner surface of the cavity of the resulting first cell structure (not shown) to form an inner wall, thereby to produce a second cell structure (not shown) having a plurality of cells, a cavity piercing through a portion including the central axis or a given axis parallel to the central axis and an inner wall on the inner surface of the cavity.

As explained above, in the second embodiment, a ceramic material 52 is extruded in such a state that grooves formed in the form of slit 51 in the die 50 which are present at the position corresponding to the press platen 53 for the formation of inner wall in the first embodiment are masked in place of providing the press platen 53 for the formation of inner wall, the resulting extruded product is fired to produce a first cell structure having a cavity to which the partition walls are bared, and a given coating material is coated on the inner surface of the cavity of the resulting first cell structure to form an inner wall.

As the coating material, it is preferred to select a suitable material taking into consideration environmental conditions of use, such as strength characteristics, heat resistance, difference in thermal expansion coefficient of the coating material and material of the cell structure, and corrosion resistance. For example, mention may be made of ceramic cement. The coating amount of coating material is not particularly limited so long as it is sufficient for filling up the space between the partition walls which open at and are exposed to the cavity and further forming a cement layer inside the cavity to form an inner wall, when, for example, ceramic cement is used. Considering the adhesion to the cell structure, there can be suitably used a ceramic cement material coated on the outer peripheral surface of the honeycomb structure as disclosed in JP-A-5-269388. The ceramic cement disclosed in JP-A-5-269388 is a mixture of cordierite particles with ceramic fibers, colloidal silica and inorganic filler. When high heat conductivity is required as an inner wall, a material of high heat conductivity, such as SiC particles may be added.

The third embodiment of the method for producing a cell structure according to the present invention will be explained below. That is, the third embodiment of the method for producing a cell structure according to the present invention is a method for producing a cell structure having a plurality of cells partitioned with partition walls which comprises extruding a ceramic material from a die having a plurality of grooves formed in the form of slit (the die can be the same as used in the second embodiment) and firing the extruded product, characterized in that the ceramic material is extruded from the die and fired to obtain a third cell structure having a plurality of cells partitioned with partition walls, and among a plurality of the cells of the resulting third cell structure, those which are positioned at a given distance from the central axis in diameter direction are bored in the direction of the central axis to form a cavity to obtain a fourth cell structure having a cavity and besides an inner wall is formed on the inner surface of the cavity of the fourth cell structure.

In the above three embodiments, as the ceramic material, there may be used the same ceramic material as explained in the embodiments of the cell structures. Furthermore, the shape of press platen for the formation of inner wall in the first embodiment can be optionally determined depending on the shape of cavity. For example, when the shape of cavity is circular, the press platen for the formation of inner wall is preferably in the shape of disc.

In FIG. 49(a), the end face of die 50 which faces press platen 54 for the formation of outer wall is horizontal, but it may form a taper or may be perpendicular as shown in FIGS. 49(b)-(c).

The catalyst structure of the present invention is characterized by comprising one of the cell structures mentioned above in which a catalyst component for purification of exhaust gas and/or an adsorptive component are supported on the surface of partition walls or intercellular walls constituting the cell structure. Usually, γ-alumina as a carrier material for catalyst component which has a high specific surface area is coated on the surface of partition walls or intercellular walls and/or on the surface of pores inside the partition walls, and the catalyst component is supported on the surface of pores in the γ-alumina layer.

As the catalyst components used in the present invention, heat resistant oxides containing at least one noble metal selected from Pt, Pd and Rh are preferred for attaining effective removal of harmful components such as HC, CO and NOx discharged from, for example, internal combustion engines.

Moreover, the adsorptive components used in the present invention include, for example, those which are mainly composed of zeolite, active carbon, etc. For providing the adsorptive component on the structure without using a bypass system, a heat resistance of at least 500° C. or higher is required, and thus zeolite is preferred. Zeolites may be either natural products or synthetic products, and kind thereof is not particularly limited, but those which have an Si/Al molar ratio of not less than 40 are preferred from the points of heat resistance, endurance and hydrophobic properties. Specific examples are ZSM-5, USY, β-zeolite, silicalite, metallosilicate, etc. Zeolites may be used each alone or in combination of two or more.

When the cell structure is used as a filter by permeating a fluid through the partition walls or intercellular walls, it is preferred to seal both ends of cells alternately.

The adsorption apparatus of the present invention is characterized in that the above catalyst structure is provided in flow paths of a fluid containing components to be adsorbed. Specifically, mention may be made of adsorption apparatuses disclosed in U.S. Pat. No. 5,315,824, JP-A-7-232084 and German Patent DE19502345A1, in which the structure having cavity is replaced with the above-mentioned catalyst structure.

The fuel reforming apparatus of the present invention is characterized in that the above catalyst structure is provided in flow paths of raw material gas and/or reformed gas. For example, there is a fuel reforming apparatus provided with a reaction tube through which a raw material gas is passed, the catalyst structure disposed in the reaction tube and a heater for heating the reaction tube, wherein a heater is provided in the cavity of the honeycomb structure to heat internally the catalyst structure. In this case, it is necessary to inhibit the raw material gas from flowing into the cavity, and sealing of the raw material gas is carried out by employing a construction of pressing a sealing member against the periphery of the inner wall. The construction may be such that the catalyst structures are disposed at multiple-stage in the gas flow direction. Moreover, the construction may be such that a raw material gas is passed through cells of the catalyst structure and thereafter the raw material gas is passed through the cavity of the catalyst structure.

Specifically, mention may be made of the apparatus disclosed in JP-A-2000-44204 in which the above catalyst structure is used in place of the structure having a cavity. Since it is required to seal the cavity against the gas which passes through the cell passage portion, the above-mentioned structure can be utilized. Furthermore, in order to perform efficient heat exchange with the fluid which passes through the cavity, it is also effective to provide difference in level or fins at the surface of inner wall of the cavity. Moreover, it is also effective to increase heat conductivity of the inner wall per se.

The heat recovery apparatus of the present invention is characterized by having the catalyst structure mentioned above as a heat storage material. Specifically, mention may be made of the apparatus disclosed in JP-A-11-211371 and JP-A-8-67502 in which the above catalyst structure is used in place of the structure having a cavity.

EXAMPLE

The present invention will be further specifically explained by the following examples, which should not be construed as limiting the invention in any manner.

Examples 1-7

A ceramic material (raw material for molding) 52 comprising a mixture of talc, kaolin and alumina as cordierite raw materials, water, a binder, etc. was extruded from die 50 having a plurality of grooves formed in the form of slit 51 shown in FIGS. 49(a)-(d), followed by firing to produce a cordierite ceramic honeycomb structure having a plurality of cells partitioned with partition walls. In this case, press platen 53 for the formation of inner wall corresponding to the shape of the inner wall (in the shape of a disc in FIG. 49(a)) was disposed above the central part of the end face of the die 50 on the side from which ceramic material 52 was extruded, and a guide 58 of conical shape for attaining uniform flowing of ceramic material 52 was disposed underneath the press platen 53 for the formation of inner wall, and, in this state, ceramic material 52 was extruded from grooves formed in the form of slit 51 of die 50, whereby a cavity was formed simultaneously with molding of the honeycomb structure and besides an inner wall was simultaneously formed on the inner surface of the cavity. The thus extrusion molded honeycomb structure (not shown) was dried and fired to obtain a cordierite honeycomb structure (not shown) having an inner wall on the inner surface of the cavity.

Figure 52:
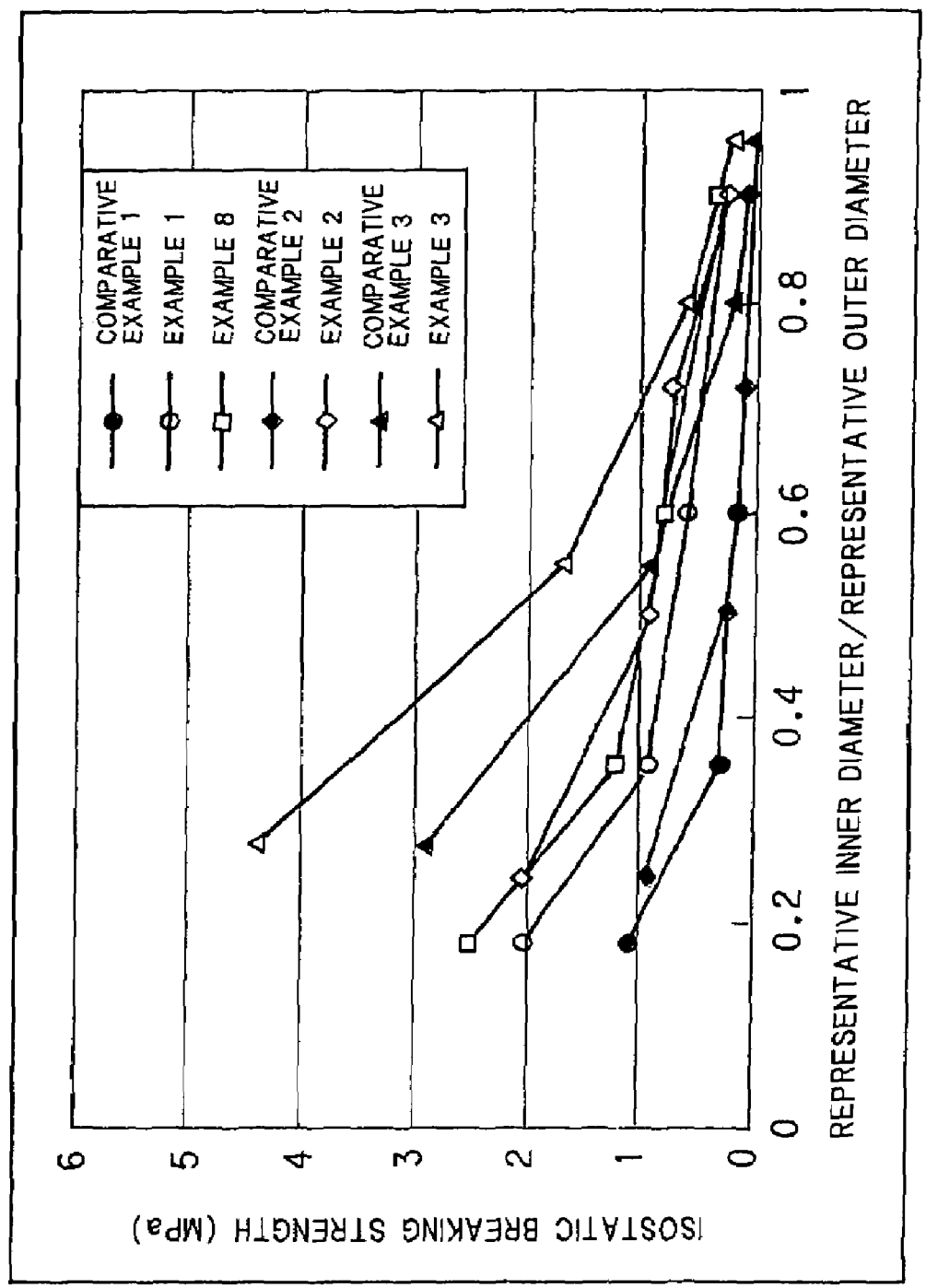
FIG. 52 is a graph which shows the results of measurement of isostatic breaking strength of the honeycomb structures obtained in Examples 1-3, Comparative Examples 1-3 and Example 8.
Figure 54:
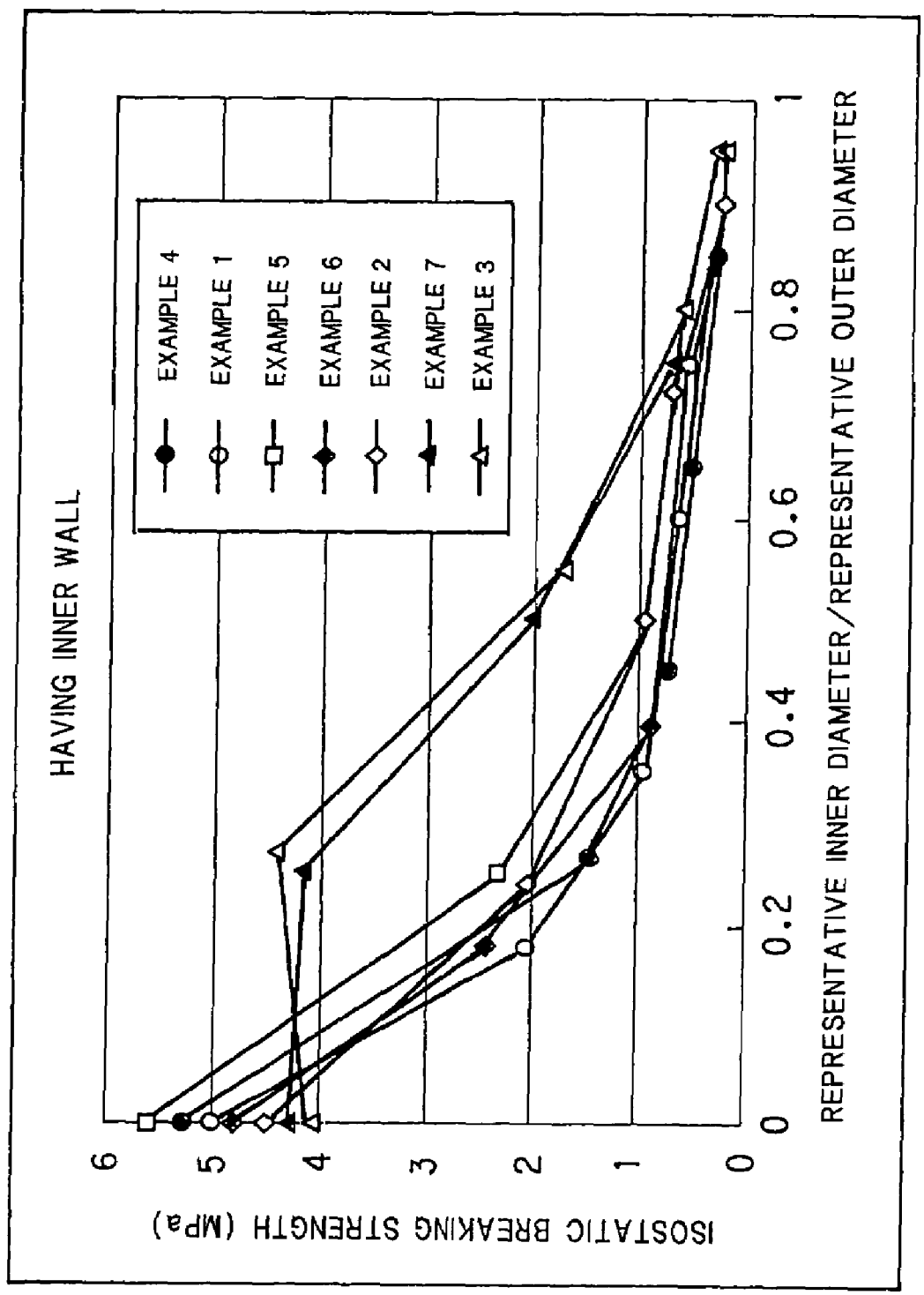
FIG. 54 is a graph which shows the results of measurement of isostatic breaking strength of the honeycomb structures obtained in Examples 1-7.

The size and cell construction of the honeycomb structures obtained in Examples 1-7 are as follows: Example 1 (having inner wall; outer diameter: 144 mm; shape of cells: tetragon; cell construction: 6 mil/400 cpsi (thickness of partition wall: 6 mil=0.15 mm (1 mil=¹⁄₁₀₀₀inch), cell density: 400/square inch)), Example 2 (having inner wall; outer diameter: 106 mm; shape of cells: hexagon; cell construction: 6 mil/400 cpsi), Example 3 (having inner wall; outer diameter: 106 mm; shape of cells: triangle; cell construction: 6 mil/300 cpsi), Example 4 (having inner wall; outer diameter: 191 mm; shape of cells: tetragon; cell construction: 6 mil/400 cpsi), Example 5 (having inner wall; outer diameter: 106 mm; shape of cells: tetragon; cell construction: 6 mil/400 cpsi), Example 6 (having inner wall; outer diameter: 120 mm; shape of cells: hexagon; cell construction: 6 mil/400 cpsi), and Example 7 (having inner wall; outer diameter: 120 mm; shape of cells: triangle; cell construction: 6 mil/400 cpsi). In each case, the size of the cavity was set so as to give the representative inner diameter/representative outer diameter as shown in FIG. 52 and FIG. 54. Here, the thickness of the inner wall was set depending on the representative radius of the cavity.

When the partition walls of cells are relatively thick, for example, 6 mil (0.15 mm) or more, the die structure may be as shown in FIG. 49(a). However, in case the partition walls are thinner than 6 mil, molding is possible even with the construction shown in FIG. 49(a), but the construction shown in FIG. 49(b) is preferred because partition walls around the inner wall are hardly deformed at the time of molding. When the sectional shape of the cavity is not circular, but tetragonal, it is preferred to use the construction as shown in FIG. 49(c). Furthermore, when the outer contour of the honeycomb structure is circular or oval and the contour of the cavity is tetragonal, it is preferred to use the construction shown in FIG. 49(b) as the outer wall forming part of the die and the construction shown in FIG. 49(c) as the inner wall forming part of the die. Moreover, the constructions shown in FIGS. 49(a)-(c) may be combined.

The thickness of outer wall of the honeycomb structure is also an important element from the viewpoint of isostatic breaking strength, and if a sufficient stiffness of the outer wall cannot be secured, peripheral surface of the outer wall may be broken with deformation due to insufficient stiffness. For example, in the case of partition wall of 6 mil (0.15 mm), the thickness of outer wall was set at 0.5-1 mm. When thickness of the outer wall or inner wall is thick, thermal shock resistance of the cell structure may decrease, and hence thickness of the inner and outer walls were set after checking the conditions of use.

Example 8

A cell structure was obtained in the same manner as in Example 1, except that the shape of the die used in Example 1 was changed so that the resulting cell structure had a thick wall portion (padded portion) formed at the portion with which the inner wall contacted and, furthermore, a reinforced structure provided by forming a curving part at the corner of points of intersection of partition walls.

Comparative Examples 1-3

Examples 1-3 were repeated, except that the extrusion molding was carried out with removing the press platen 53 for the formation of inner wall (without providing the press platen 53) to obtain cell structures having no inner wall. That is, the size and cell construction of the honeycomb structures obtained in Comparative Examples 1-3 are as follows: Comparative Example 1 (having no inner wall; outer diameter: 144 mm; shape of cells: tetragon; cell construction: 6 mil/400 cpsi), Comparative Example 2 (having no inner wall; outer diameter: 106 mm; shape of cells: hexagon; cell construction: 6 mil/400 cpsi), and Comparative Example 3 (having no inner wall; outer diameter: 106 mm; shape of cells: triangle; cell construction: 6 mil/300 cpsi). In these comparative examples, the size of cavity was set so as to give (representative inner diameter/representative outer diameter) shown in FIG. 52.

Figure 53:
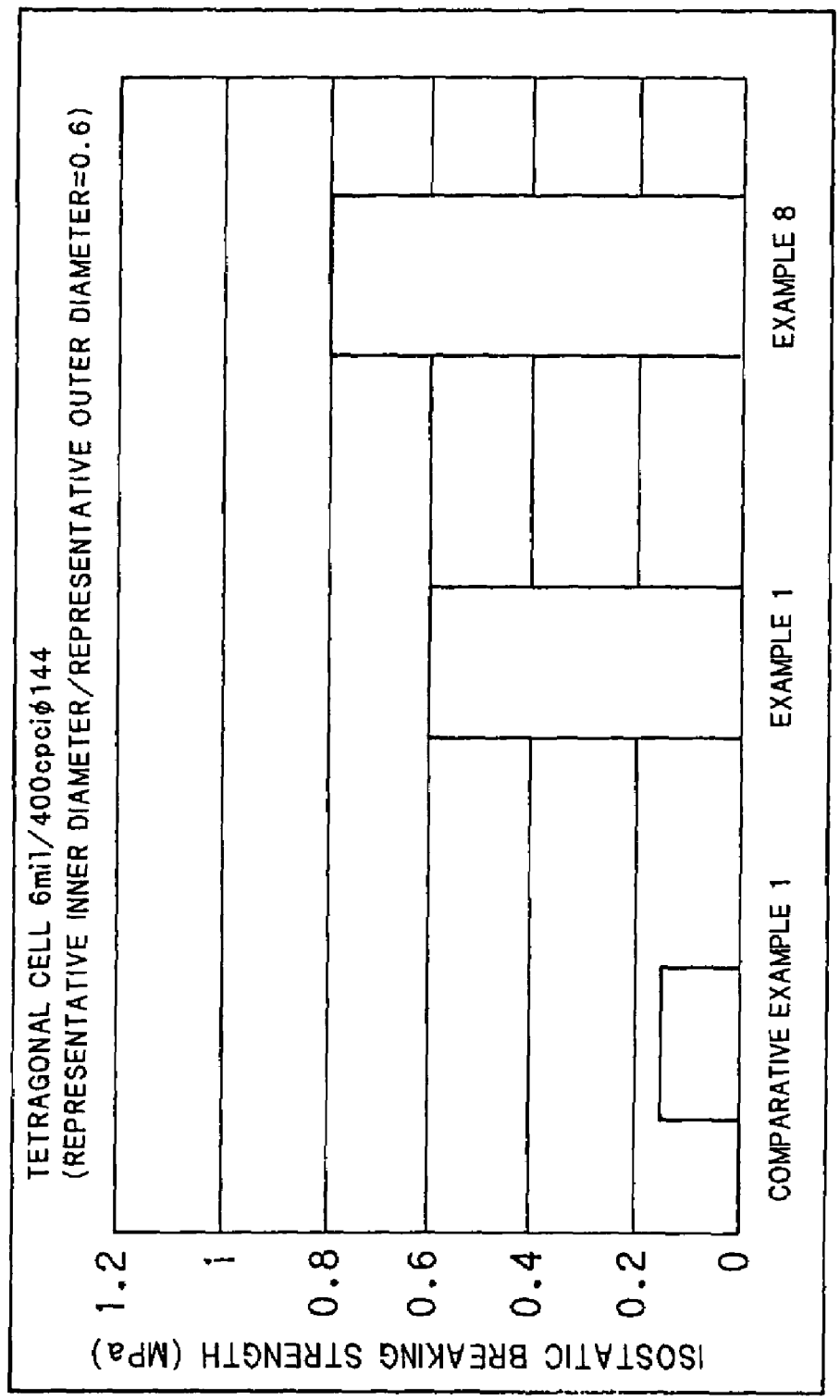
FIG. 53 is a graph which shows the results of measurement of isostatic breaking strength of the honeycomb structures obtained in Comparative Example 1, Example 1 and Example 8.

The isostatic breaking strength of the cell structures obtained in Example 1, Comparative Example 1 and Example 8 with setting the (representative inner diameter/representative outer diameter) at 0.6 was measured. The results are shown in FIG. 53. It can be seen from FIG. 53 that the cell structure of Example 1 having an inner wall of 2 mm thick was improved over the cell structure of Comparative Example 1 having no inner wall in isostatic breaking strength. Furthermore, it can be seen that the cell structure of Example 8 provided with a reinforcement structure was further improved in isostatic breaking strength. The isostatic breaking strength was obtained by measuring a water pressure under which the cell structure was broken in such a manner that the portion inside the positions shown by the dotted lines (breaking positions) in FIG. 50 fell in the cavity. The isostatic breaking strength is specified in JASO which is the automobile standard published from a corporation Jidosha Gijutsu Kyokai (Automobile Technology Society) and means a compressive breaking strength of the cell structure when isostatic, namely, isotropic hydrostatic pressure load is applied to the outer peripheral surface of the cell structure and is shown by a pressure value (water pressure) when the breakage occurs.

The same results were obtained with honeycomb structures in which ceramic cement was coated on the inner wall of the honeycomb structures after fired.

The isostatic breaking strength of cell structures obtained in Examples 1-8 and Comparative Examples 1-3 was measured in the same manner as above, and the results are shown in FIG. 52 and FIG. 54. From FIGS. 52-54, it can be seen that isostatic breaking strength of the honeycomb structure provided with inner wall or reinforcement structure was improved over that of the honeycomb structure provided with no inner wall, and in the case of the shape of cells being tetragon or hexagon, isostatic breaking strength was sharply improved when the ratio of representative inner diameter to representative outer diameter of the honeycomb structure is about 0.5 or less, and in the case of the shape of cells being triangle, isostatic breaking strength was sharply improved when the ratio of representative inner diameter to representative outer diameter of the honeycomb structure is about 0.8 or less.

Examples 9-23

Figure 55:
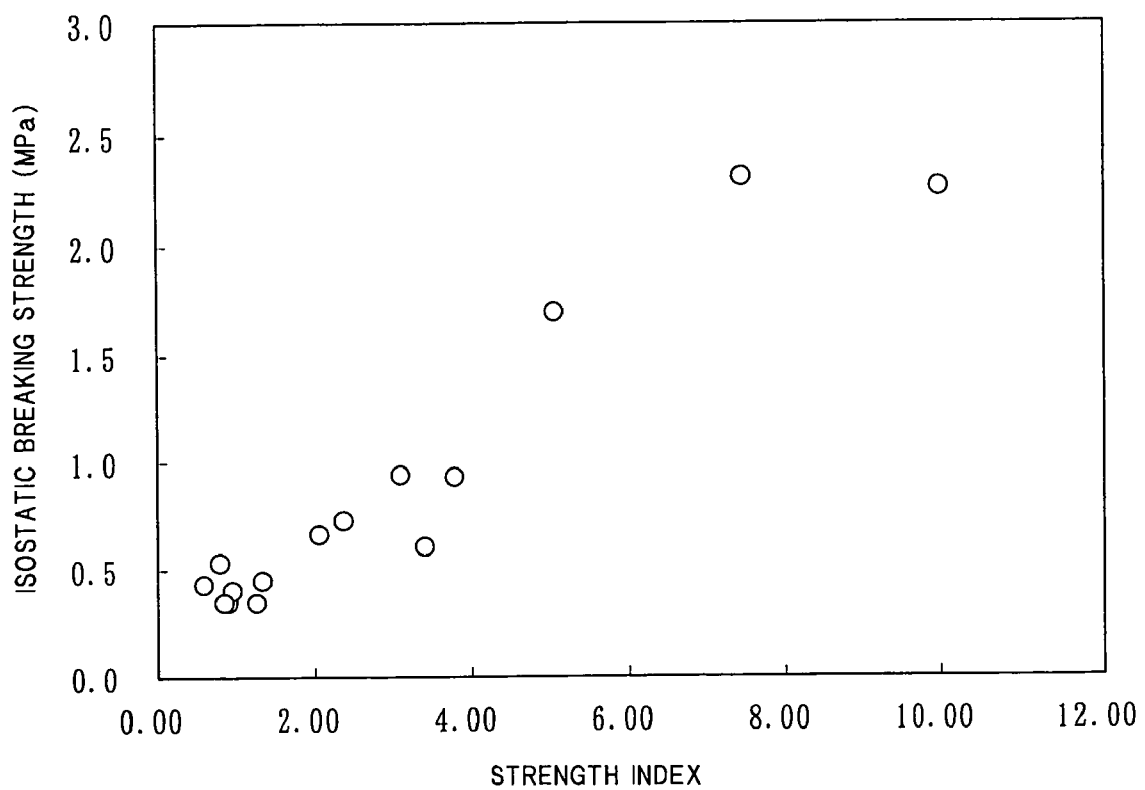
FIG. 55 is a graph which shows relations between isostatic breaking strength and strength index of the honeycomb structures obtained in Examples 9-23.

Cell structures having the shape as shown in FIG. 29 and the structure as shown in Table 3 were produced in the same manner as in Example 1. As for these cell structures, A and B shown in FIG. 29 were calculated, and, furthermore, strength index was calculated. Moreover, isostatic breaking strength of these cell structures was measured in the same manner as above, and the results are shown in Table 3. Further, a graph of relations between isostatic breaking strength and strength index is shown in FIG. 55. It can be seen from FIG. 55 that isostatic breaking strength and strength index have a very good correlation. It was confirmed that in order to give a preferred isostatic breaking strength of about 0.49 MPa or higher, further about 1.03 MPa or higher, and especially 1.96 MPa or higher, it is preferred to set the strength index at 0.02 or more, further 0.04 or more, especially 0.06 or more.

TABLE 3

| | Thickness of partition wall | | Cell density | Cell pitch | Outer diameter | Cavity diameter | B | A | B/A | Isostatic breaking strength | Strength index | Remark |
|---|---|---|---|---|---|---|---|---|---|---|---|---|
| | mil | mm | cpsi | Mm | mm | mm | mm | mm | | MPa | (×10$^{-2}$) | |
| Exam. 9 | 6.5 | 0.170 | 400 | 1.27 | 105.7 | 25.4 | 52.30 | 25.65 | 2.0 | 2.3 | 7.45 | |
| Exam. 10 | 6.5 | 0.170 | 400 | 1.27 | 105.7 | 50.8 | 46.35 | 52.99 | 0.9 | 0.4 | 1.37 | |
| Exam. 11 | 4.5 | 0.115 | 600 | 1.04 | 105.7 | 25.4 | 52.30 | 25.65 | 2.0 | 1.7 | 5.08 | |
| Exam. 12 | 4.5 | 0.115 | 600 | 1.04 | 105.7 | 50.8 | 46.35 | 52.99 | 0.9 | 0.3 | 0.94 | |

TABLE 3-continued

| | Thickness of partition wall | | Cell density | Cell pitch | Outer diameter | Cavity diameter | B | A | B/A | Isostatic breaking strength | Strength index | Remark |
|---|---|---|---|---|---|---|---|---|---|---|---|---|
| | mil | mm | cpsi | Mm | mm | mm | mm | mm | | MPa | (×10$^{-2}$) | |
| Exam. 13 | 4.5 | 0.115 | 600 | 1.04 | 105.7 | 25.4 | 25.14 | 28.27 | 0.9 | 0.4 | 0.97 | Eccentric cavity |
| Exam. 14 | 4.5 | 0.115 | 400 | 1.27 | 105.7 | 25.4 | 52.30 | 25.65 | 2.0 | 0.6 | 3.41 | |
| Exam. 15 | 4.5 | 0.115 | 400 | 1.27 | 105.7 | 50.8 | 46.35 | 52.99 | 0.9 | 0.4 | 0.63 | |
| Exam. 16 | 3.5 | 0.090 | 600 | 1.04 | 105.7 | 25.4 | 52.30 | 25.65 | 2.0 | 0.9 | 3.11 | |
| Exam. 17 | 3.5 | 0.090 | 600 | 1.04 | 105.7 | 25.4 | 35.04 | 26.71 | 1.3 | 0.3 | 1.29 | Eccentric cavity |
| Exam. 18 | 3.5 | 0.090 | 400 | 1.27 | 105.7 | 25.4 | 52.30 | 25.65 | 2.0 | 0.7 | 2.09 | |
| Exam. 19 | 3.5 | 0.090 | 400 | 1.27 | 105.7 | 25.4 | 35.04 | 26.71 | 1.3 | 0.3 | 0.86 | Eccentric cavity |
| Exam. 20 | 2.5 | 0.064 | 900 | 0.85 | 84.0 | 10.0 | 42.00 | 10.00 | 4.2 | 2.3 | 10.00 | |
| Exam. 21 | 2.5 | 0.064 | 900 | 0.85 | 84.0 | 15.0 | 41.50 | 16.00 | 2.6 | 0.9 | 3.81 | |
| Exam. 22 | 2.5 | 0.064 | 900 | 0.85 | 84.0 | 20.0 | 41.00 | 20.00 | 2.1 | 0.7 | 2.38 | |
| Exam. 23 | 2.5 | 0.064 | 900 | 0.85 | 84.0 | 30.0 | 40.00 | 33.00 | 1.2 | 0.5 | 0.83 | |

INDUSTRIAL APPLICABILITY

As explained above, the present invention can provide a cell structure which has an excellent isostatic breaking strength and can exhibit proper sealing function in its cavities, a method for producing the cell structure, a catalyst structure, etc.

The invention claimed is:

1. A cell structure which is a cylindrical cell structure comprising a plurality of cells which pierce through the structure between two end faces and are flow paths for fluid, an outer wall which encloses the cells and a cavity which pierces in the direction of a central axis of the structure through a portion including the central axis or a given axis parallel to the central axis:
wherein the cell structure further has an inner wall on the inner surface of the cavity, the cells are partitioned in the form of a honeycomb with partition walls, and a strength index represented by the formula:

strength index=$(T/CP)^2 \times (B/A)^2$ is not less than 0.02 in which T denotes a thickness (mm) of the partition wall, CP denotes a cell pitch (mm), A denotes a length (mm) of a line formed by linking, along the outer wall, points of intersection of the outer wall with two tangent lines which contact with inner contour of the inner wall and extend in parallel in longitudinal direction of the partition wall, and B denotes a distance (mm) between a point of contact of the tangent line with the inner contour of the inner wall and a point of intersection of the tangent line with the closest outer wall at the section formed by cutting the cell structure along a plane perpendicular to the central axis of the cell structure.

2. A cell structure according to claim 1, wherein the strength index is not less than 0.04.

3. A cell structure according to claim 1, wherein the cell structure has a plurality of cavities and a plurality of the cavities are disposed so as to give a value of B/A larger than the maximum value of B/A of a cell structure having one cavity of a volume equal to the total volume of a plurality of the cavities.

4. A cell structure according to claim 1, wherein the ratio (d/D) of a representative inner diameter (d) to a representative outer diameter (D) of the honeycomb structure or foam structure is not more than 0.5, when a section formed by cutting the cell along a plane perpendicular to the central axis being tetragonal or hexagonal, and the ratio (d/D) of a representative inner diameter (d) to a representative outer diameter (D) of the honeycomb structure or foam structure is not more than 0.8, when the section formed by cutting the cell along a plane perpendicular to the central axis being triangle or wavy.

5. A cell structure according to claim 1, wherein among the partition walls or intercellular walls, the thickness of a partition wall (first or second reinforcing partition wall) or an intercellular wall (first or second intercellular wall) positioned within a predetermined distance from the inner wall in diameter direction is larger than the thickness of other partition walls (ordinary partition walls) or intercellular walls (ordinary intercellular walls).

6. A cell structure according to claim 5, wherein, among the partition walls or intercellular walls, the thickness of at least one partition wall (a third or fourth reinforcing partition wall) or at least one intercellular wall (a third or fourth reinforcing intercellular wall), the tip of which contacts with the inner wall, which contacts with the inner wall or which is externally apart from the inner wall is larger than the thickness of other partition walls (ordinary partition wall) or intercellular walls (ordinary intercellular walls), when a section formed by cutting the cell along a plane perpendicular to the central axis being tetragonal.

7. A cell structure according to claim 1, wherein among the cells, a cell density of a given number of cells (first or second reinforcing cells) positioned at a given distance from the inner wall in diameter direction is higher than the cell density of the cells (ordinary cells) other than the first or second reinforcing cells.

8. A cell structure according to claim 1, wherein, among the cells, a given number of cells (third reinforcing cells) positioned at a given distance from the central axis in diameter direction is partitioned with at least one partition wall (fifth reinforcing partition wall) or intercellular wall (fifth reinforcing intercellular wall) which divides the inside of the cells.

9. A cell structure according to claim 1, wherein a partition wall (sixth reinforcing partition wall) or intercellular wall (sixth reinforcing intercellular wall) which contact with the inner wall has thick wall portions formed at the contact portions.

10. A cell structure according to claim 1, wherein among the cells, a given number of cells (fourth reinforcing cells)

positioned at a given distance from the inner wall in diameter direction is filled in their cell passages with a non-gaseous material for filling cells.

11. A cell structure according to claim 1, wherein among the partition walls or intercellular walls, a partition wall (seventh reinforcing partition wall) or intercellular wall (seventh reinforcing intercellular wall) positioned at a given distance from the inner wall in diameter direction is more densified than other partition walls (ordinary partition walls) or intercellular walls (ordinary intercellular walls).

12. A cell structure according to claim 1, wherein the partition walls or intercellular walls comprise a partition wall (eighth reinforcing partition wall) concentric with the inner wall and partition wall (ninth reinforcing partition wall) radial from the central axis, or an intercellular wall (eighth reinforcing intercellular wall) concentric with the inner wall and intercellular wall (ninth reinforcing intercellular wall) radial from the central axis.

13. A cell structure according to claim 1, wherein the partition walls or intercellular walls comprise a partition wall (tenth reinforcing partition wall) concentric with the inner wall and wavy partition wall (eleventh reinforcing partition wall), or intercellular wall (tenth reinforcing intercellular wall) concentric with the inner wall and wavy intercellular wall (eleventh reinforcing intercellular wall).

14. A cell structure according to claim 1, wherein the partition walls or intercellular walls comprise a partition wall (twelfth reinforcing partition wall) concentric with the inner wall and corrugated partition wall (thirteenth reinforcing partition wall), or intercellular wall (twelfth reinforcing intercellular wall) concentric with the inner wall and corrugated intercellular wall (thirteenth reinforcing intercellular wall).

15. A cell structure according to claim 1, wherein the honeycomb structure or the foam structure comprises at least one component selected from the group consisting of the following component (a), component (b), component (c) and component (d):
  (a): ceramic materials containing at least one compound selected from the group consisting of cordierite, alumina, mullite, lithium aluminum silicate, aluminum titanate, titania, zirconia, silicon nitride, aluminum nitride, silicon carbide, calcium silicate, zirconium phosphate, zirconyl phosphate, ceria, yttria and magnesia,
  (b): ceramic materials containing composites of the compounds shown in (a),
  (c): heat resistant metals,
  (d): adsorptive materials containing at least one selected from the group consisting of active carbon, silica gel and zeolite.

16. A cell structure according to claim 1, wherein an inner wall comprises a material higher in mechanical strength than the partition wall or the intercellular wall.

17. A cell structure according to claim 1, wherein a reinforcing material concentric with the inner wall is provided on the inner surface side of the inner wall, and a cushioning member having compressibility and elasticity is provided between the inner surface of the inner wall and the reinforcing material.

18. A cell structure which is a cylindrical cell structure of a foam structure comprising a plurality of cells which pierce through the structure between two end faces and are flow paths for fluid, an outer wall which encloses the cells and a cavity which pierces in the direction of a central axis of the structure through a portion including the central axis or a given axis parallel to the central axis, where the cell structure further has an inner wall on the inner surface of the cavity, and the cells communicate three-dimensionally with each other through intercellular walls.

19. A cell structure according to claim 18, wherein the inner wall has a thickness of not less than 1% of a representative radius of the cavity;
  wherein when the cavity is a circle the representative radius is the radius of the circle,
  wherein when the cavity is a tetragram the representative radius is the radius of a first imaginary circle the entirely circumscribes the tetragram, and
  wherein when the cavity is an oval the representative radius is the radius of a second imaginary circle that is the largest circle that can inscribe the oval.

20. A method for producing a cell structure which comprises extruding a ceramic material from a die having a plurality of grooves formed in the form of slit and firing the extruded product to produce a cell structure having a plurality of cells partitioned with partition walls;
  wherein ceramic material is extruded from the grooves formed in the form of slit of the die in such a state that a press platen having a given shape for the formation of an inner wall is provided above the central portion of an end face of the die on the side from which the ceramic material is extruded and a guide for uniformly flowing the ceramic material is provided underneath the press platen for the formation of the inner wall on the side of the die into which the ceramic material is introduced, and wherein the resulting extruded product is fired, thereby to produce a cell structure having a plurality of cells, a cavity which pierces the portion including the central axis or a given axis parallel to the central axis in the direction of the central axis, and an inner wall on the inner surface of the cavity.

21. A method for producing a cell structure which comprises extruding a ceramic material from a die having a plurality of grooves formed in the form of slit and firing the extruded product to produce a cell structure having a plurality of cells partitioned with partition walls;
  wherein the ceramic material is extruded from the grooves formed in the form of slit in such a state of masking the grooves formed in the form of slit positioned above the central portion of the end face of the die, said end face is the side from which the ceramic material is extruded, and wherein the resulting extruded product is fired, thereby to produce a first cell structure having a cavity at which the partition walls are bared and, furthermore, a given coating material is coated on the inner surface of the cavity of the resulting first cell structure to form an inner wall, thereby to produce a second cell structure having a plurality of the cells, the cavity which pierces the portion including the central axis or a given axis parallel to the central axis in the direction of the central axis, and the inner wall on the inner surface of the cavity.

22. A method for producing a cell structure which comprises extruding a ceramic material from a die having a plurality of grooves formed in the form of slit and firing the extruded product to produce a cell structure having a plurality of cells partitioned with partition walls;
  wherein the ceramic material is extruded from the die and the resulting extruded product is fired, thereby to obtain a third cell structure having a plurality of cells partitioned with the partition walls, and the cells of the third cell structure which are positioned at a given distance from the central axis in diameter direction among a plurality of the cells are bored in the direction of central axis to form a cavity, thereby to obtain a fourth cell structure and simultaneously an inner wall is formed on the inner surface of the cavity of the fourth cell structure.

23. A catalyst structure comprising a cell structure and a catalyst component, wherein the cell structure is a cylindrical cell structure comprising a plurality of cells which pierce through the structure between two end faces and are flow paths for fluid, an outer wall which encloses the cells and a cavity which pierces in the direction of a central axis of the structure through a portion including the central axis or a given axis parallel to the central axis:
wherein the cell structure further has an inner wall on the inner surface of the cavity, the cells are partitioned in the form of a honeycomb with partition walls, and a strength index represented by the formula:

$$\text{strength index} = (T/CP)^2 \times (B/A)^2$$

is not less than 0.02 in which T denotes a thickness (mm) of the partition wall, CP denotes a cell pitch (mm), A denotes a length (mm) of a line formed by linking, along the outer wall, points of intersection of the outer wall with two tangent lines which contact with inner contour of the inner wall and extend in parallel in longitudinal direction of the partition wall, and B denotes a distance (mm) between a point of contact of the tangent line with the inner contour of the inner wall and a point of intersection of the tangent line with the closest outer wall at the section formed by cutting the cell structure along a plane perpendicular to the central axis of the cell structure, and the catalyst component for purification of exhaust gas and/or a adsorptive component are supported on the surface of the partition walls or intercellular walls constituting the cell structure and/or on the surface of inside pores of the cell structure.

24. A catalyst structure according to claim 23, wherein both ends of the cells are alternately sealed so that a fluid passing through the cells as flow paths is passed through the inside of the partition walls or intercellular walls.

25. A catalyst structure according to claim 23, wherein the adsorptive component is mainly composed of zeolite.

* * * * *